(12) United States Patent
Sugiyama et al.

(10) Patent No.: US 7,318,202 B2
(45) Date of Patent: Jan. 8, 2008

(54) USER INTERFACE DEVICE AND ITS DISPLAY METHOD

(75) Inventors: Kinko Sugiyama, Nagano-ken (JP); Chiaki Nakamori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 10/848,984

(22) Filed: May 18, 2004

(65) Prior Publication Data

US 2005/0007616 A1 Jan. 13, 2005

(30) Foreign Application Priority Data

May 19, 2003 (JP) ............... 2003-140969
Jun. 23, 2003 (JP) ............... 2003-178726

(51) Int. Cl.
*G06F 3/048* (2006.01)

(52) U.S. Cl. ............ 715/788; 715/527; 715/808; 715/806; 715/841

(58) Field of Classification Search ............ 715/804, 715/527, 808, 788, 798–801, 781, 782, 806, 715/810, 841, 842; 358/1.13; 345/157, 345/158

See application file for complete search history.

(56) References Cited

U.S. PATENT DOCUMENTS

| | | | | |
|---|---|---|---|---|
| 5,305,435 A | * | 4/1994 | Bronson | 715/777 |
| 5,604,544 A | * | 2/1997 | Bertram | 348/601 |
| 5,724,106 A | * | 3/1998 | Autry et al. | 348/734 |
| 6,625,483 B2 | * | 9/2003 | Hoium et al. | 600/509 |

(Continued)

FOREIGN PATENT DOCUMENTS

JP 2002-140155 5/2002

(Continued)

OTHER PUBLICATIONS

West et al, title "Sams Teach Yourself Macromedia Firework MX in 24 Hours", Sams, Dec. 4, 2002, pp. 1-8.*

(Continued)

*Primary Examiner*—Ba Huynh
*Assistant Examiner*—TuyetLien Tran
(74) *Attorney, Agent, or Firm*—Martine Penilla & Gencarella, LLP

(57) ABSTRACT

While a design manipulation window 62 is open on the screen, in response to a user's selection of a print manipulation option bar 244*b*, the design manipulation window 62 is slid to change over the display to a print manipulation window 64. A print preview display field 241 included in the design manipulation window 62 remains on the display to form part of the print manipulation window 64, while a design menu display field 242 is made to disappear from the screen and a print menu display field 243 appears on the screen. The changeover of the manipulation window includes switch of the display of the menu display field 242 or 243. The user can thus readily recognize a changeover of manipulation mode on the screen. The remaining display of the print preview display field 241 effectively enhances the user's working efficiency.

10 Claims, 17 Drawing Sheets

U.S. PATENT DOCUMENTS

| | | |
|---|---|---|
| 6,678,891 B1 * | 1/2004 | Wilcox et al. ................. 725/42 |
| 7,190,473 B1 * | 3/2007 | Cook et al. ................. 358/1.15 |
| 2003/0052919 A1 * | 3/2003 | Tlaskal et al. .............. 345/764 |
| 2003/0146915 A1 * | 8/2003 | Brook et al. ................. 345/473 |
| 2003/0160815 A1 * | 8/2003 | Muschetto .................. 345/733 |
| 2004/0100486 A1 * | 5/2004 | Flamini et al. ............. 345/723 |
| 2006/0087670 A1 * | 4/2006 | Smith ........................ 358/1.13 |

FOREIGN PATENT DOCUMENTS

| | | |
|---|---|---|
| JP | 2002-288160 | 10/2002 |

OTHER PUBLICATIONS

Usal, Published article, "Sliding Menu", http://web.archive.org/web/2003032020058/http://www/kirupa/com/developer/flash5/slidingmenu.htm, Mar. 20, 2003, pp. 1-3.*

Abstract of Japanese Patent Publication No. 2002-140155, Pub. Date: May 17, 2002, Patent Abstracts of Japan.

Abstract of Japanese Patent Publication No. 2002-288160, Pub. Date: Oct. 4, 2002, Patent Abstracts of Japan.

* cited by examiner (a) PRINT PREVIEW DATA   241(24a)

(b) DESIGN MENU DATA

| Layout ▶ |
| Image Arrangement ▶ |
| Image Adjustment ▶ |
| Character ▶ |

242(24b)

(c) PRINT MENU DATA   243(24c)

Enter Number of Copies

Copies [ 1 ]

[Print Start]

(d) OPTION BAR DATA   244(24d)

244a    244b

| Design | Print |

(a) PRINT PREVIEW DATA   251(125a)

(b) DESIGN MENU DATA

252(125b)

(c) PRINT MENU DATA   253(125c)

(d) OPTION BAR DATA   254(125d)

(e) OPERABLE KEY DATA   255(125e)

USER INTERFACE DEVICE AND ITS DISPLAY METHOD

BACKGROUND OF THE INVENTION

1. Field of the Invention

The present invention relates to a user interface and its display method that cause a user interface-related window to be displayed on a display unit, which is capable of displaying various pieces of information.

2. Description of the Prior Art

A user interface device that causes a user interface-related window to be displayed on a display unit, which is capable of displaying various pieces of information, is disclosed, for example, in Japanese Patent Laid-Open Gazette No. 2002-288160. In this prior art user interface display, while a print preview image is displayed in a print preview window on the display unit, the user's click of an Edit button switches over the manipulation mode to an editing mode, which enables the user to change the settings at a specified place in the print preview image. The user can directly edit the image, for example, a document, displayed on the print preview window. This enhances the user's working efficiency. In the user interface proposed in this cited reference, however, the user's click of the Edit button does not change over the display on the display unit but makes the print preview window continuously displayed on the display unit. The user can thus not readily recognize the switchover of the manipulation mode to the editing mode. The prior art technique of changing over the display described in this cited reference closes the print preview window, prior to the switchover to the editing mode. This, however, worsens the user's working efficiency.

Another known user interface device disclosed in Japanese Patent Laid-Open Gazette No. 2002-140155 utilizes the functions of a remote control to implement various settings on the screen. This cited reference shows, as a prior art, a user interface to display a menu and an operation panel on the screen and effectuate a selection of a desired menu option by operations of cursor keys like Up, Down, Left, and Right keys and an OK key on the remote control. As described in this cited reference, selection of a desired menu option on the screen by the operations of the cursor keys and the OK key on the remote control is the general procedure. A separate window changeover key other than the cursor keys and the OK key is used to change over the display on the screen. In the case of remote controls of HDD/DVD players, for example, this window changeover key has various names (for example, a Return key) and is provided at various locations, which are set independently by the respective manufacturers. This confuses the user about the operations of remote controls of multiple different manufacturers. When the user desires to recognize a previous window after changeover of the display, the user is required to additionally operate the remote control and return the display to the previous window.

SUMMARY OF THE INVENTION

The object of the present invention is to provide a user interface device and its display method that enable a user to readily recognize a changeover of manipulation mode between a first manipulation mode and a second manipulation mode on the screen and enhance the user's working efficiency through the changeover. The object of the invention is also to provide a user interface device and its display method that enable all settings including changeover of manipulation window to be executed by simple operations of a remote control. The object of the invention is further to provide a user interface device and its display method that enable the user to readily recognize a previously displayed window after changeover of the display without any additional operations of a remote control.

In order to achieve at least part of the aforementioned objects, a user interface device and a user interface display method of the present invention are constructed as follows.

A first user interface device of the present invention is a device that causes a user interface-related window to be displayed on a display unit, which is capable of displaying various pieces of information, the user interface device including: a command input module that receives a user command; a storage module that stores at least data of a first manipulation menu display field, data of a second manipulation menu display field, and data of a viewer display field for displaying a processing object of each manipulation; and a display control module that, when the user command received by the command input module is a first manipulation window display command, reads the data of the first manipulation menu display field and the data of the viewer display field from the storage module and displays a first manipulation window, which includes the first manipulation menu display field arranged at a predetermined location on a periphery of the viewer display field, on the display unit and when the user command received by the command input module is a second manipulation window display command, reads the data of the second manipulation menu display field and the data of the viewer display field from the storage module and displays a second manipulation window, which includes the second manipulation menu display field arranged at a location different from the predetermined location on the periphery of the viewer display field, on the display unit, in the case of input of the second manipulation window display command during display of the first manipulation window on the display unit, the display control module sliding the first manipulation window to make the first manipulation menu display field disappear from the display on the display unit and to make the second manipulation menu display field appear on the display on the display unit, while making the viewer display field remain on the display on the display unit, so as to display the second manipulation window on the display unit, in the case of input of the first manipulation window display command during display of the second manipulation window on the display unit, the display control module sliding the second manipulation window to make the second manipulation menu display field disappear from the display on the display unit and to make the first manipulation menu display field appear on the display on the display unit, while making the viewer display field remain on the display on the display unit, so as to display the first manipulation window on the display unit.

In response to the user's input of the second manipulation window display command during display of the first manipulation window, the user interface device of the invention makes the first manipulation menu display field disappear from the screen and makes the second manipulation menu display field appear on the screen, while making the viewer display field included in the first manipulation window remain on the display unit to form part of the second manipulation window. In response to the user's input of the first manipulation window display command during display of the second manipulation window, on the other hand, the user interface device of the invention makes the second manipulation menu display field disappear from the screen and makes the first manipulation menu display field appear on the screen, while making the viewer display field included in the second manipulation window remain on the display unit to form part of the first manipulation window. The changeover of the manipulation window includes switch of the display of the manipulation menu display fields. The user can thus readily recognize a changeover of manipulation mode on the screen. The remaining display of the viewer display field through the changeover of the manipulation window effectively enhances the user's working efficiency, compared with the structure of making the viewer display field once disappear from the screen and calling the viewer display field again.

When the first manipulation menu display field is arranged on one side on the periphery of the viewer display field, the first manipulation menu display field may directly adjoin to one side of the viewer display field or may be located on one side of the viewer display field across another display field. This explanation is also applied to the second manipulation menu display field.

In one preferable application of the first user interface device of the invention, the first manipulation window has the first manipulation menu display field located on a left side or a right side of the viewer display field, the second manipulation window has the second manipulation menu display field located on the right side or the left side of the viewer display field, and the display control module slides the first manipulation window or the second manipulation window leftward or rightward.

In another preferable application of the first user interface device of the invention, the first manipulation window has the first manipulation menu display field located on an upper side or a lower side of the viewer display field, the second manipulation window has the second manipulation menu display field located on the lower side or the upper side of the viewer display field, and the display control module slides the first manipulation window or the second manipulation window upward or downward.

In another preferable application of the first user interface device of the invention, the storage module stores a first manipulation window option bar corresponding to the first manipulation window display command and a second manipulation window option bar corresponding to the second manipulation window display command, the display control module arrays the first manipulation window option bar and the second manipulation window option bar in an identical direction of an alignment of the viewer display field and the first manipulation menu display field and displays the first manipulation window option bar longer and the second manipulation window option bar shorter, for display of the first manipulation window on the display unit, and the display control module arrays the first manipulation window option bar and the second manipulation window option bar in an identical direction of an alignment of the viewer display field and the second manipulation menu display field and displays the second manipulation window option bar longer and the first manipulation window option bar shorter for display of the second manipulation window on the display unit. In this application, the display control module may slide the first manipulation window option bar and the second manipulation window option bar to change the longer side and the shorter side, when the first manipulation window is slid to change over the display to the second manipulation window on the display unit or when the second manipulation window is slid to change over the display to the first manipulation window.

In still another preferable application of the first user interface device of the invention, the first manipulation menu display field displays at least one of a menu, a guidance, and a data setting input box relating to image editing, the second manipulation menu display field displays at least one of a menu, a guidance, and a data setting input box relating to image printing, and the viewer display field displays an image as an object of the image editing or the image printing. In this application, the viewer display field may display a captured image of a motion picture as the object of the image editing or the image printing. And the user interface device of this application may be mounted on a printer, which connects with a disk recorder using a hard disk or a digital versatile disc as a recording medium of motion pictures and has a function of capturing a motion picture from the recording medium of the disk recorder.

In one embodiment, the first user interface device of the invention may be a computer including the display unit, the command input module, the storage module, and the display control module.

A first user interface display method of the present invention is a method by computer software that reads required data from a storage module, which stores at least data of a first manipulation menu display field, data of a second manipulation menu display field, and data of a viewer display field for displaying a processing object of each manipulation, and displays the required data on a display unit, the user interface display method including the steps of: (a) receiving a user command; (b) when the user command is a first manipulation window display command, reading the data of the first manipulation menu display field and the data of the viewer display field from the storage module and displaying a first manipulation window, which includes the first manipulation menu display field arranged at one side on periphery of the viewer display field, on the display unit; (c) when the user command is a second manipulation window display command, reading the data of the second manipulation menu display field and the data of the viewer display field from the storage module and displaying a second manipulation window, which includes the second manipulation menu display field arranged at the opposite side on the periphery of the viewer display field, on the display unit; (d) in the case of input of the second manipulation window display command during display of the first manipulation window on the display unit, sliding the first manipulation window to make the first manipulation menu display field disappear from the display on the display unit and to make the second manipulation menu display field appear on the display on the display unit, while making the viewer display field remain on the display on the display unit, so as to display the second manipulation window on the display unit; and (e) in the case of input of the first manipulation window display command during display of the second manipulation window on the display unit, sliding the second manipulation window to make the second manipulation menu display field disappear from the display on the display unit and to make the first manipulation menu display field appear on the display on the display unit, while making the viewer display field remain on the display on the display unit, so as to display the first manipulation window on the display unit.

In this first user interface display method, the changeover of the manipulation window includes switch of the display of the manipulation menu display fields. The user can thus readily recognize a changeover of manipulation mode on the screen. The remaining display of the viewer display field through the changeover of the manipulation window effectively enhances the user's working efficiency, compared with the structure of making the viewer display field once disappear from the screen and calling the viewer display field again. The first user interface display method of the invention may include any of the additional structures applied to the first user interface device discussed above or may include any steps to attain such additional functions of the user interface device.

The user interface display method is also actualized by a corresponding computer program that causes one or multiple computers to execute the respective steps of the method. This program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. By causing one computer to execute all the steps of the program or causing multiple computers to share execution of the steps, the equivalent effects to those of the first user interface display method discussed above are attained.

A second user interface device of the present invention is a device that causes a user interface-related window to be displayed on a display unit, which is capable of displaying various pieces of information, the user interface device including: a reception module that receives a radio signal transmitted from a remote control unit, in response to a press of one of Up, Down, Left, Right, and OK keys on the remote control unit; a radio signal identification module that identifies the radio signal received by the reception module as one of Up, Down, Left, Right, and OK commands; a storage module that stores data for displaying at least a first manipulation window and a second manipulation window on the display unit; and a display control module that, when the first manipulation window or the second manipulation window is read from the storage module and is displayed on the display unit, executes a setting on the displayed manipulation window or a changeover of display to the other manipulation window, in response to one of the Up, Down, Left, Right, and OK commands identified by the radio signal identification module.

While the first manipulation window (or the second manipulation window) is read out and displayed on the display unit, the user interface device of the invention executes the setting on the displayed manipulation window or the changeover to the other manipulation window, in response to one of the Up, Down, Left, Right, and OK commands corresponding to a press of one of the Up, Down, Left, Right, and OK keys on the remote control. Any conventional remote control has the Up, Down, Left, Right, and OK keys. This arrangement enables all the settings including changeover of the manipulation windows to be executed by simple operations of the Up, Down, Left, Right, and OK keys on the conventional remote control.

In one preferable application of the second user interface of the invention, the storage module stores at least data of a first manipulation menu display field, data of a second manipulation menu display field, and data of a common display field for displaying contents common to the first manipulation window and the second manipulation window as the data for displaying the first manipulation window and the second manipulation window, the display control module reads the data of the first manipulation menu display field and the data of the common display field from the storage module and displays the first manipulation window, which has the first manipulation menu display field arranged at a predetermined location on a periphery of the common display field, on the display unit for display of the first manipulation window on the display unit, the display control module reads the data of the second manipulation menu display field and the data of the common display field from the storage module and displays the second manipulation window, which has the second manipulation menu display field arranged at a location different from the predetermined location on the periphery of the common display field, on the display unit for display of the second manipulation window on the display unit, and while the first manipulation window or the second manipulation window is displayed on the display unit, when the command identified by the radio signal identification module represents a direction of the second manipulation menu display field or the first manipulation menu display field from a cursor position on the displayed first manipulation window or second manipulation window, the display control module displays the second manipulation window or the first manipulation window on the display unit.

In the above application of the second user interface device, the common display field may be a viewer display field for displaying a processing object of each manipulation. Further in the above application, while the first manipulation window or the second manipulation window is displayed on the display unit, when the command identified by the radio signal identification module represents a direction of the second manipulation menu display field or the first manipulation menu display field from a cursor position on the displayed first manipulation window or second manipulation window, the display control module may slide the first manipulation window or the second manipulation window to make the first manipulation menu display field or the second manipulation menu display field disappear from the display on the display unit and to make the second manipulation menu display field or the first manipulation menu display field appear on the display on the display unit, while making the common display field remain on the display on the display unit, so as to display the second manipulation window or the first manipulation window on the display unit. Further in the above application of the second user interface device, as one modification, the storage module may store a first manipulation window option bar and a second manipulation window option bar, the display control module may array the first manipulation window option bar and the second manipulation window option bar in an identical direction of an alignment of the common display field and the first manipulation menu display field and displays the first manipulation window option bar longer and the second manipulation window option bar shorter for display of the first manipulation window on the display unit, and the display control module may array the first manipulation window option bar and the second manipulation window option bar in an identical direction of an alignment of the common display field and the second manipulation menu display field and displays the second manipulation window option bar longer and the first manipulation window option bar shorter for display of the second manipulation window on the display unit. In this modified structure, the display control module may slide the first manipulation window option bar and the second manipulation window option bar to change the longer side and the shorter side, when the first manipulation window is slid to change over the display to the second manipulation window on the display unit or when the second manipulation window is slid to change over the display to the first manipulation window. Still further in the application of the second user interface device, as another modification, the first manipulation menu display field may display at least one of a menu, a guidance, and a data setting input box relating to image editing, the second manipulation menu display field may display at least one of a menu, a guidance, and a data setting input box relating to image printing, and the common display field may display preview of an image as an object of the image editing or the image printing. In this modified structure, the common display field may display a captured image of a motion picture as the object of the image editing or the image printing.

In one embodiment, the second user interface device of the invention may be a computer including the reception module, the radio signal identification module, the storage module, and the display control module. The second user interface device may be mounted on a disk recorder using a hard disk or a digital versatile disc as a recording medium of motion pictures.

A second user interface display method of the present invention is a method by computer software that reads required data from a storage module, which stores at least data of a first manipulation menu display field and data of a second manipulation menu display field, and displays the required data on a display unit, the user interface display method including the steps of: (a) receiving a radio signal transmitted from a remote control unit, in response to a press of one of Up, Down, Left, Right, and OK keys on the remote control unit; (b) identifying the radio signal received in the step (a) as one of Up, Down, Right, and OK commands; and (c) when the first manipulation window or the second manipulation window is read from the storage module and is displayed on the display unit, executing a setting on the displayed manipulation window or a changeover of display to the other manipulation window, in response to one of the Up, Down, Left, Right, and OK commands identified in the step (b).

While the first manipulation window (or the second manipulation window) is read out and displayed on the display unit, the second user interface method of the invention executes the setting on the displayed manipulation window or the changeover to the other manipulation window, in response to one of the Up, Down, Left, Right, and OK commands corresponding to a press of one of the Up, Down, Left, Right, and OK keys on the remote control. Any conventional remote control has the Up, Down, Left, Right, and OK keys. This arrangement enables all the settings including changeover of the manipulation windows to be executed by simple operations of the Up, Down, Left, Right, and OK keys on the conventional remote control. The second user interface display method of the invention may include any of the additional structures applied to the second user interface device discussed above or may include any steps to attain such additional functions of the second user interface device.

The second user interface display method is also actualized by a computer program that causes one or multiple computers to execute the respective steps of the method. This program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. By causing one computer to execute all the steps of the program or causing multiple computers to share execution of the steps, the equivalent effects to those of the second user interface display method discussed above are attained.

DESCRIPTION OF THE PREFERRED EMBODIMENTS

First Embodiment

Figure 1:
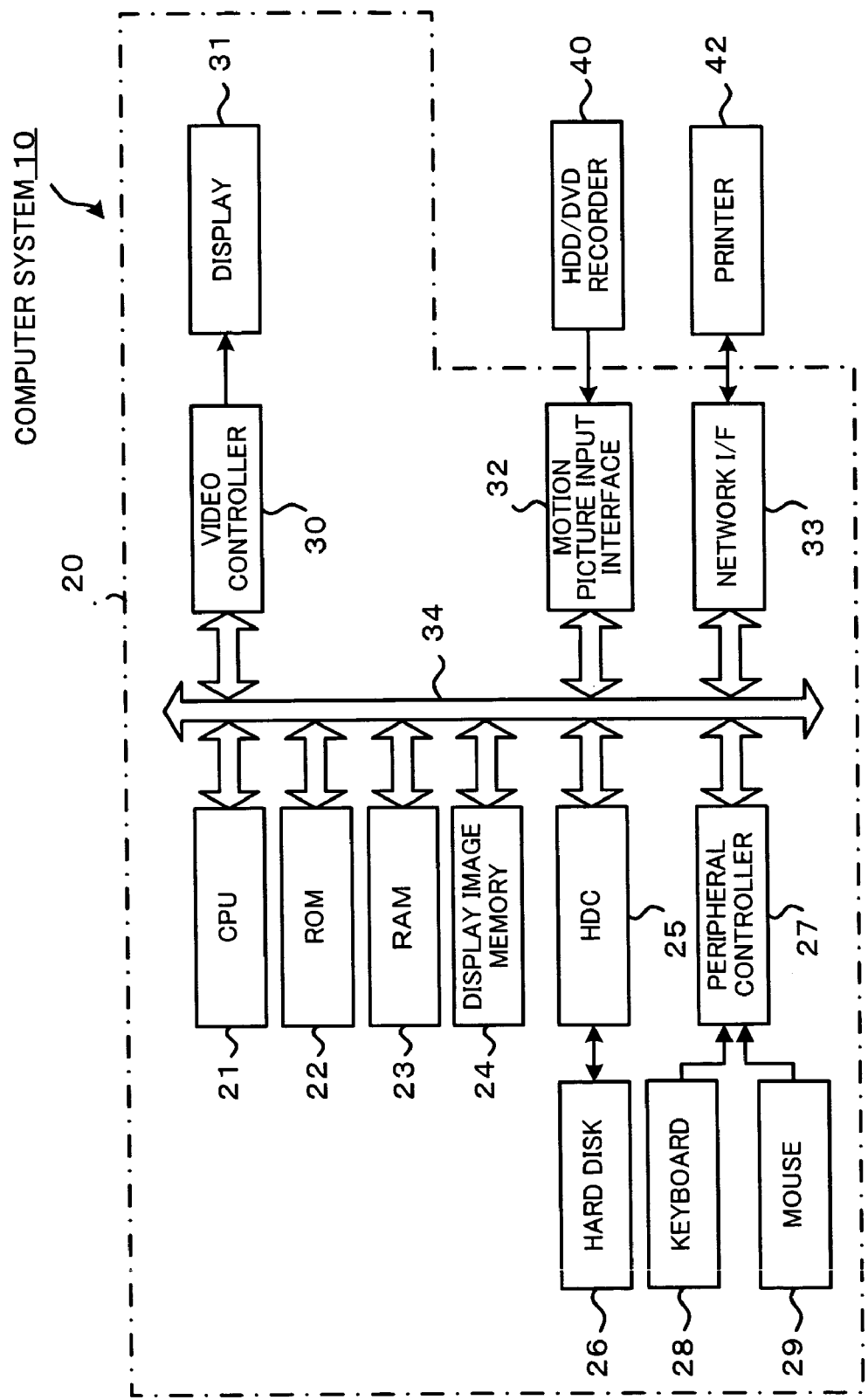
FIG. 1 schematically illustrates the construction of a computer system 10 in one embodiment.
Figure 2:
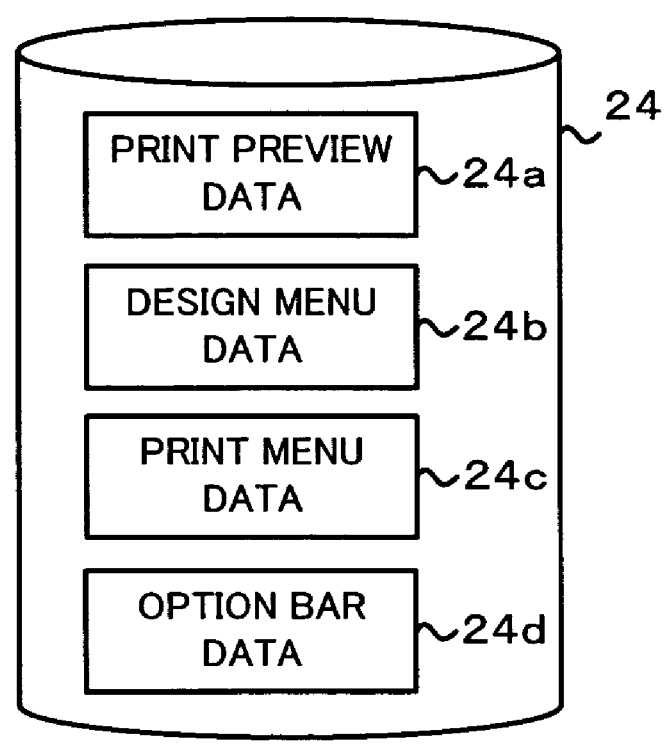
FIG. 2 shows the structure of a display image memory 24.
Figure 3:
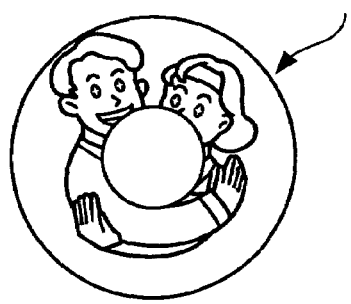
FIG. 3 shows the contents of respective data.
Figure 3:
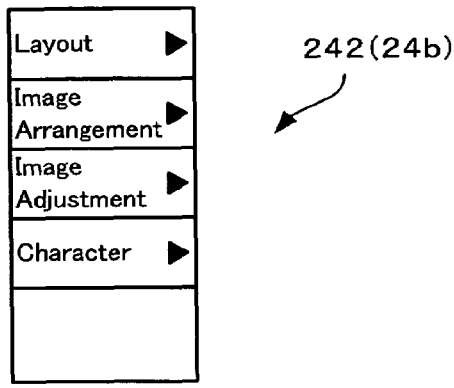
Figure 4:
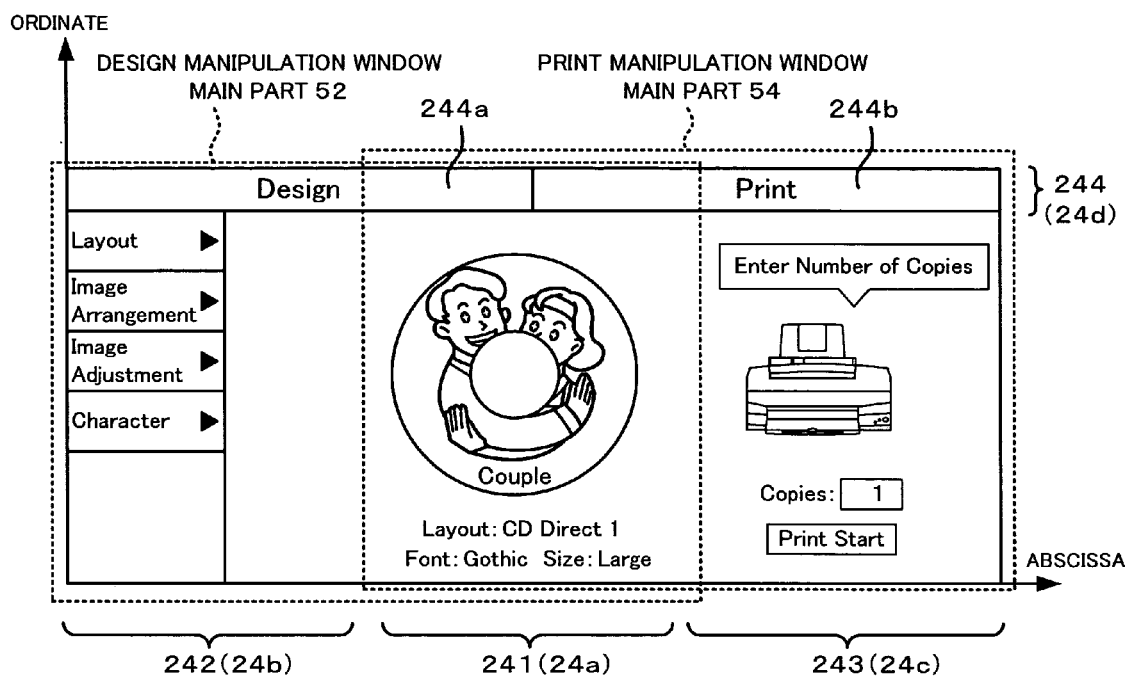
FIG. 4 shows respective display fields.

FIG. 1 schematically illustrates the construction of a computer system 10 in one embodiment of the invention. FIG. 2 shows the structure of a display image memory 24. FIG. 3 shows the contents of respective data. FIG. 4 shows respective display fields. This computer system 10 has a personal computer 20, an HDD (hard disk drive)/DVD (digital versatile disc) recorder 40, and a printer 42 as shown in FIG. 1.

The personal computer 20 includes a CPU 21 that executes diverse controls, a ROM 22 that stores various control programs, a RAM 23 that temporarily stores data, a display image memory 24 that stores image data of various windows to be displayed on a display 31, a hard disk controller 25 that controls an HDD 26 for storing various data and various application programs, and a peripheral controller 27 that controls input signals from a keyboard 28 and a mouse 29. The personal computer 20 also includes a video controller 30 that controls display of windows on the display 31, based on the image data stored in the display image memory 24, a motion picture input interface 32 that takes charge of input of video signals from the HDD/DVD recorder 40 connected via a connector (not shown) and a network interface 33 that takes charge of input and output of data from and to the network printer 42 connected via a LAN cable (not shown). These constituents are interconnected via a bus 34 to ensure transmission of data.

The operating system of the personal computer 20 is stored in the HDD 26 and is loaded into a predetermined area in the RAM 23 on power supply according to a loader written in a boot block of the HDD 26. An application program that is executed to edit and print motion pictures captured as still images from the HDD/DVD recorder 40 (hereafter referred to as captured image processing program) is also stored in the HDD 26 and is loaded into a predetermined area in the RAM 23 in response to a start command of the captured image processing program.

Figure 6:
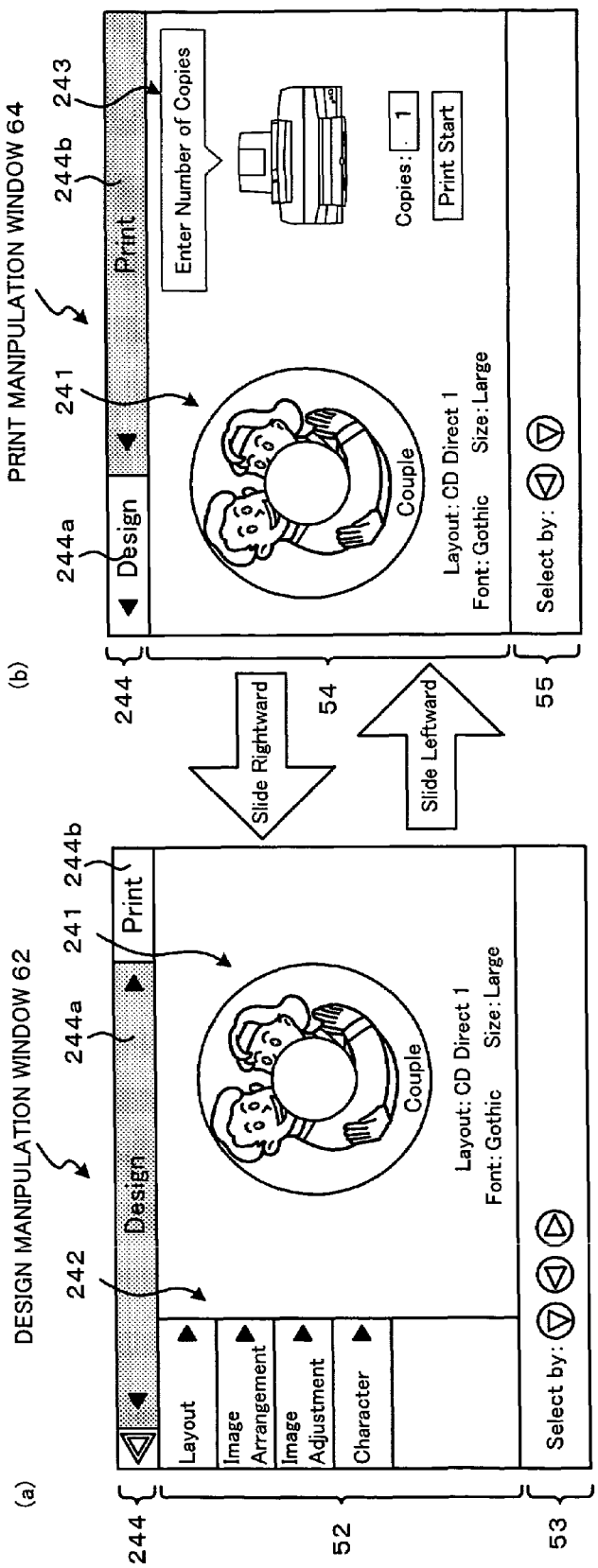
FIG. 6 shows each manipulation window.

Data relating to the captured image processing program are discussed in detail, among the data stored in the display image memory 24. The display image memory 24 stores print preview data 24a, design menu data 24b, print menu data 24c, and option bar data 24d as shown in FIG. 2. The print preview data 24a are generated corresponding to the settings of the type of printing medium, the image arrangement, the image adjustment, and the character on the captured image processing program, based on a still image obtained by capturing a motion picture from the HDD/DVD recorder 40. The print preview data 24a form a print preview display field 241 for displaying a print preview on the display 31 as shown in FIG. 3(*a*). The design menu data 24b are related to editing of images and form a design menu display field 242 for displaying four menu options 'Layout' 'Image Arrangement', 'Image Adjustment', and 'Character' on the display 31 as shown in FIG. 3(*b*). Here the menu option 'Layout' is used to select one printing medium among multiple options of printing medium (for example, CD label, CD jacket, postcard, A4 sheet). The menu option 'Image Arrangement' is used to select any of available image arrangement options including movement, enlargement, contraction, and rotation of each image. The menu option 'Image Adjustment' is used to select the settings of the color (full color or monochromatic), the lightness, and the contrast. The menu option 'Character' is used to select the settings of the font, the size, and the color of characters. The print menu data 24c are related to printing of images and form a print menu display field 243 for displaying a message box that requests the user to enter the required number of copies, an input box that enables the user to enter the required number of copies, and a Print Start button that is clicked by the user to give a print start command, on the display 31 as shown in FIG. 3(*c*). The option bar data 24d are used to call either a design manipulation window 62 (see FIG. 6) or a print manipulation window 64 (see FIG. 6) and form an option bar display field 244 for displaying a design manipulation option bar 244a on the left to call the design manipulation window 62 and a print manipulation option bar 244b on the right to call the print manipulation window 64, on the display 31 as shown in FIG. 3(*d*).

The respective data 24a through 24d relate three numerical data representing the lightness of R, G, and B to each pixel located at a lattice point defined by an ordinate value and an abscissa value in a plane coordinate system. FIG. 4 shows the pixels located on the plane coordinate system in the form of an image, instead of the numerical data. As shown in FIG. 4, the design menu data 24b (the design menu display field 242) is located on the left side of the print preview data 24a (the print preview display field 241). The print menu data 24c (the print menu display field 243) is located on the right side of the print preview data 24a (the print preview display field 241). The option bar data 24d (the option bar display field 244) is located on the upper side of the respective data 24a through 24c. The whole image shown in FIG. 4 has a size exceeding the width of a screen display area on the display 31. Each area of dotted line in FIG. 4 represents a size corresponding to the width of the screen display area on the display 31. The dotted area including the print preview display field 241 and the design menu display field 242 represents a design manipulation window main part 52, whereas the dotted area including the print preview display field 241 and the print menu display field 243 represents a print manipulation window main part 54.

The HDD/DVD recorder 40 is connected with a TV set (not shown) and has known recording functions to input motion pictures from the TV set and record the input motion pictures into an HDD or a DVD and known playback functions to output motion pictures recorded in the HDD or the DVD to the TV set.

The printer 42 is a known inkjet printer that causes color inks to be ejected from color ink cartridges onto a printing medium for printing. The printer 42 is connected with the network interface 33 of the personal computer 20 via a print server (not shown) to print images on a printing medium based on print data input from the personal computer 20 and to output status data on the printing status to the personal computer 20.

Figure 5:
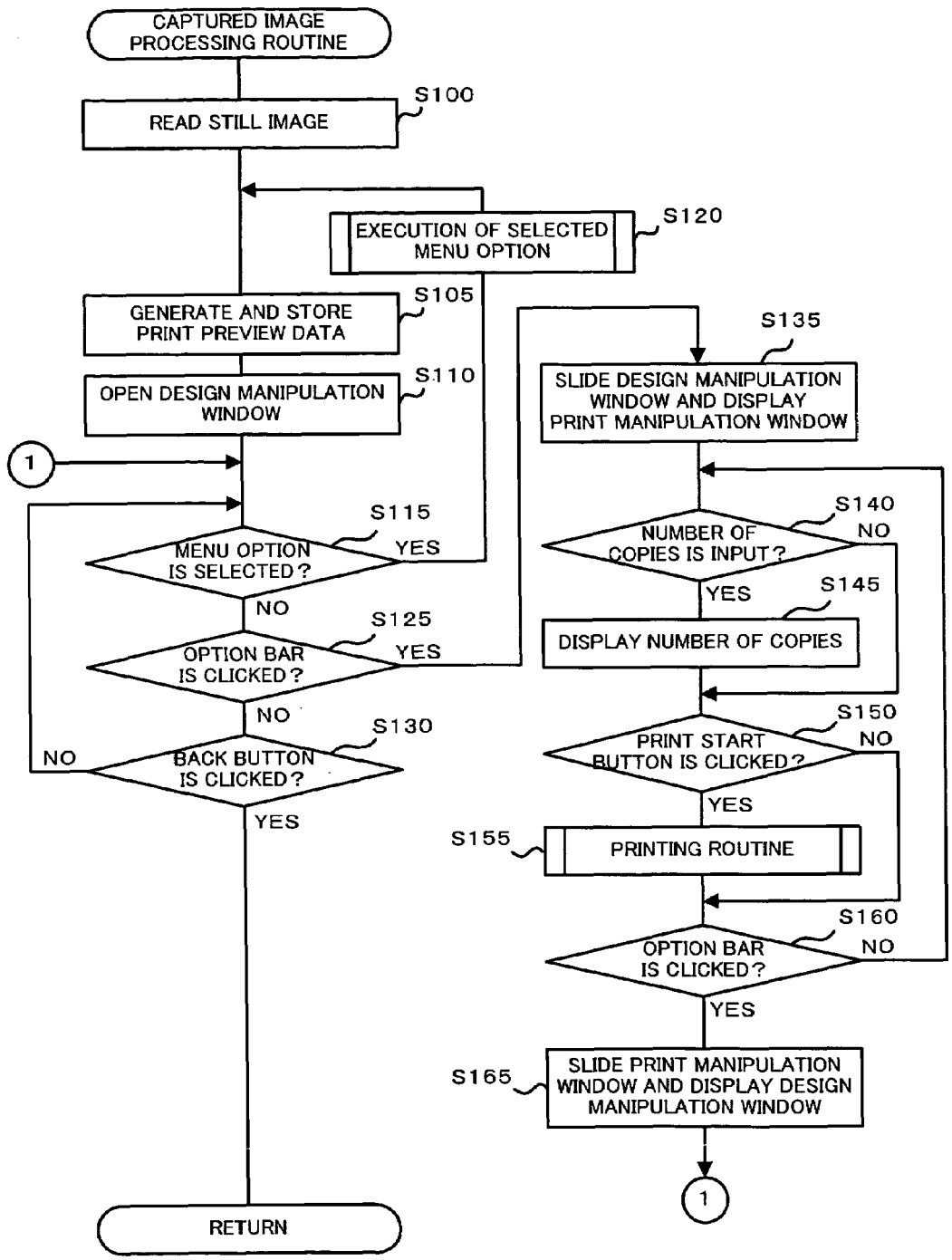
FIG. 5 is a flowchart showing a captured image processing routine.

The following describes the operations of the computer system 10 constructed as discussed above, especially an operation of the personal computer 20 to change over the display between the design manipulation window 62 and the print manipulation window 64 on the display 31. FIG. 5 is a flowchart showing a captured image processing routine, which is executed by the CPU 21 of the personal computer 20. In response to capture of a motion picture from the HDD/DVD recorder 40, the CPU 21 reads the captured image processing program stored in the HDD 26 and executes a series of processing according to the flowchart of FIG. 5.

In response to capture of a motion picture from the HDD/DVD recorder 40 as a still image, the CPU 21 of the personal computer 20 first reads the captured still image (step S100), refers to the settings of the type of printing medium, the image arrangement, the image adjustment, and the character based on the input still image, generates the print preview data 24a, and stores the generated print preview data 24a into the display image memory 24 (step S105). The type of printing medium, the image arrangement, the image adjustment, and the character are set in advance in a hierarchical manner from each menu option displayed in the design menu display field 242. Here the display image memory 24 stores data of the whole image including the print preview data 24a, the design menu data 24b, the print menu data 24c, and the option bar data 24d shown in FIG. 4. The print preview data 24a are updated according to the captured still image and related design and editing operations, while the design menu data 24b, the print menu data 24c, and the option bar data 24d are kept unchanged. The CPU 21 subsequently reads the design manipulation window 62 shown in FIG. 6 from the display image memory 24 and opens the design manipulation window 62 on the display 31 (step S110). The design manipulation window 62 includes the design manipulation window main part 52 shown in FIG. 4, a cursor key description display field 53 that shows description of available cursor key operations, the highlighted design manipulation option bar 244a, and layout information and font information shown in the lower part of the print preview display field 241.

The CPU 21 then determines whether the user selects one of the menu options in the design menu display field 242 (step S115). When the user does not select any of the menu options, the CPU 21 determines whether the user selects the print manipulation option bar 244b in the option bar display field 244 (step S125). When the user does not select the print manipulation option bar 244b, the CPU 21 subsequently determines whether the user selects a 'Back' button in the shape of a double triangular arrow (see FIG. 6) displayed on the upper left corner of the design manipulation window 62 (step S130). When the user does not select the 'Back' button, the CPU 21 returns the processing to step S115. When the user selects the 'Back' button, on the other hand, this captured image processing routine is terminated. On the termination of this routine, the screen on the display 31 is returned to the display prior to execution of this captured image processing routine.

When it is determined at step S115 that the user selects one of the menu options in the design menu display field 242, the CPU 21 executes an operation corresponding to the selected menu option (for example, in the case of selection of the menu option 'Image Arrangement', movement, enlargement, contraction, or rotation of the image) (step S120) and goes back to step S105. When it is determined at step S125 that the user selects the print manipulation option bar 244b in the option bar display field 244, the CPU 21 slides the design manipulation window 62 leftward to gradually make the design menu display field 242 disappear from the left side on the screen of the display 31 and to make the print menu display field 243 gradually appear from the right side on the screen of the display 31 and thereby eventually displays the print manipulation window 64 of FIG. 6 on the display 31 (step S135). The concrete procedure shifts the dotted area surrounding the design manipulation window main part 52 rightward along the abscissa axis with elapse of time in FIG. 4 and reads data corresponding to the shifted dotted area from the display image memory 24, so as to slide the design manipulation window 62 leftward on the display 31. The print manipulation window 64 shown in FIG. 6 includes the print manipulation window main part 54 shown in FIG. 4, a cursor key description display field 55 that shows description of available cursor key operations, the highlighted print manipulation option bar 244b, and layout information and font information shown in the lower part of the print preview display field 241.

After the print manipulation window 64 is displayed on the display 31 at step S135, the CPU 21 determines whether the user enters a numerical value in the copy number input box in the print menu display field 243 on the print manipulation window 64 (step S140). In response to the user's entry of a numerical value in the copy number input box, the CPU 21 displays the input numerical value in the input box on the display 31 (step S145) and goes to step S150. When the user does not enter any numerical value in the copy number input box, the CPU 21 immediately goes to step S150.

At step S150, the CPU 21 determines whether the user clicks the Print Start button in the print menu display field 243. In response to the user's click of the Print Start button, the CPU 21 executes a printing routine, which converts an image displayed in the print preview display field 241 into print data in a form printable by the printer 42 and outputs the print data to the printer 42 for printing (step S155) and goes to step S160. When the user does not click the Print Start button, the CPU 21 immediately goes to step S160.

At step S160, the CPU 21 determines whether the user selects the design manipulation option bar 244a in the option bar display field 244. When the user does not select the design manipulation option bar 244a, the CPU 21 returns the processing to step S140. In response to the user's selection of the design manipulation option bar 244a, the CPU 21 slides the print manipulation window 64 rightward to gradually make the print menu display field 243 disappear from the right side on the screen of the display 31 and to make the design menu display field 242 gradually appear from the left side on the screen of the display 31 and thereby eventually displays the design manipulation window 62 on the display 31 (step S165) and goes back to step S115. The concrete procedure shifts the dotted area surrounding the print manipulation window main part 54 leftward along the abscissa axis with elapse of time in FIG. 4 and reads data corresponding to the shifted dotted area from the display image memory 24, so as to slide the print manipulation window 64 rightward on the display 31.

The determination of the user's selection of the design manipulation option bar 244a or the print manipulation option bar 244b is based on input of a design manipulation window display command or a print manipulation window display command via the peripheral controller 27. The design manipulation window display command or the print manipulation window display command is generated, in response to the user's operation of the keyboard 28 or the mouse 29 to select the option bar 244a or the option bar 244b.

In the first embodiment, the display 31 corresponds to the display unit, the peripheral controller 27 corresponds to the command input module, the display image memory 24 corresponds to the storage module, and the CPU 21 and the video controller 30 correspond to the display control module of the invention. The design manipulation window 62 or the print manipulation window 64 respectively correspond to the first or the second manipulation window, the design menu display field 242 or the print menu display field 243 respectively correspond to the first or the second manipulation menu display field, and the print preview window 241 corresponds to the viewer display field of the invention. The design manipulation option bar 244a or the print manipulation option bar 244b respectively correspond to the first or the second manipulation window option bar of the invention. The description of the computer system 10 as the first embodiment of the user interface device also explains one embodiment of the user interface display method.

As described above, the computer system 10 of the embodiment changes over the display between the design menu display field 242 and the print menu display field 243, in response to the user's manipulation window changeover instruction. The user can thus readily recognize a changeover of manipulation mode on the display. The print preview window 241 remains on the screen through the changeover of the manipulation window. This arrangement desirably enhances the user's working efficiency, compared with the structure of making the print preview display field 241 once disappear from the display and calling the print preview display field 241 again.

The design manipulation window 62 has the design menu display field 242 located on the left side of the print preview display field 241, while the print manipulation window 64 has the print menu display field 243 located on the right side of the print preview display field 241. The design manipulation window 62 is slid leftward and the print manipulation window 64 is slid rightward for the changeover of the manipulation window. The design manipulation window 62 or the print manipulation window 64 accordingly has the appropriate size on the wide screen of the display 31 having an aspect ratio of 3 to 4 or 9 to 16.

The design manipulation window 62 has the longer, highlighted design manipulation option bar 244a. The user can thus readily recognize the current display as the design manipulation window 62. The display is readily changed over to the print manipulation window 64, in response to the user's selection of the shorter print manipulation option bar 244b. This explanation is also applied to the print manipulation the longer side and the shorter side in the course of changeover of the manipulation window. This enables the user to visually recognize the current display between the two manipulation windows.

In the case of execution of printing after design manipulation (editing of the image) or execution of design manipulation after printing, the user generally desires to easily confirm the identification of the display in the print preview display field 241 before and after the changeover of the manipulation window. The technique of this embodiment advantageously attains this requirement. The print preview display field 241 shows an edited still image, which is obtained by editing a motion picture captured as the still image from the HDD/DVD recorder 40, and remains in the printing process. The user can thus easily check the edited image, prior to printing.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The first embodiment describes the changeover of the display between the design manipulation window 62 and the print manipulation window 64. The technique of the invention is, however, not restricted to the changeover of the display between the design manipulation window 62 and the print manipulation window 64 but is applicable to changeover of the display between two arbitrary manipulation windows.

In the embodiment discussed above, the user interface device of the invention is actualized by the personal computer 20. In another application, the user interface device of the invention may be actualized by the printer 42, which has the built-in functions of the personal computer 20 and is directly connected with the HDD/DVD recorder 40. In this application, a remote control attached to the HDD/DVD recorder 40, instead of the keyboard 28 and the mouse 29, maybe used to input commands into the printer 42. The manipulation windows 62 and 64 may be displayed on the monitor of the TV set connecting with the HDD/DVD recorder 40, instead of the display 31. On the remote control, Up, Down, Left, and Right cursor keys and an OK key are generally used for selection and decision. The design manipulation window 62 and the print manipulation window 64 may be designed to be suitable for the manipulation of the remote control.

Figure 7:
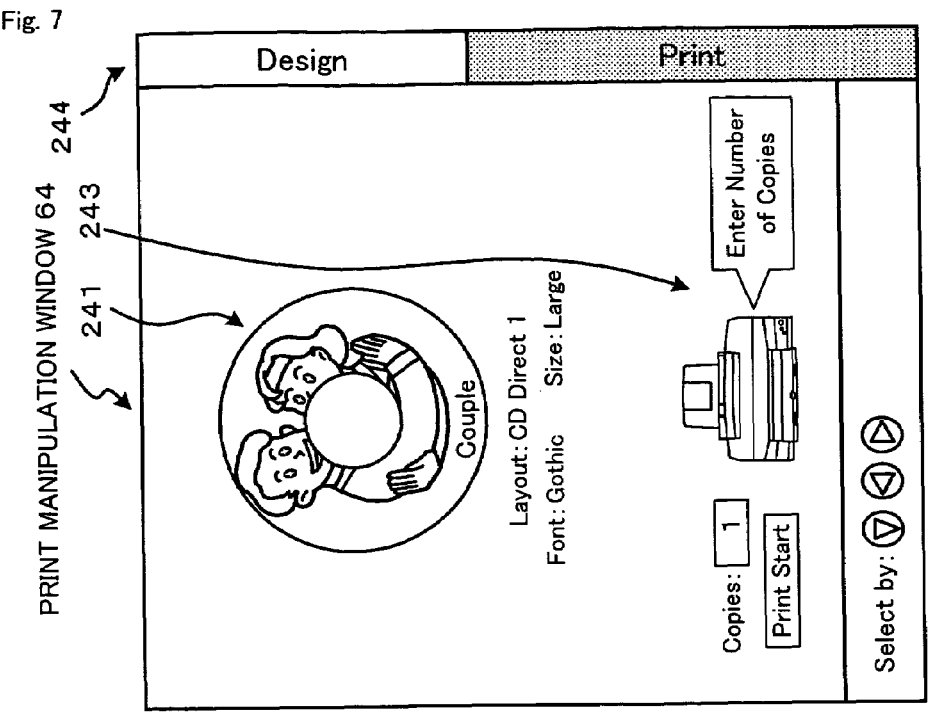
FIG. 7 shows each manipulation window in another embodiment.
Figure 7:
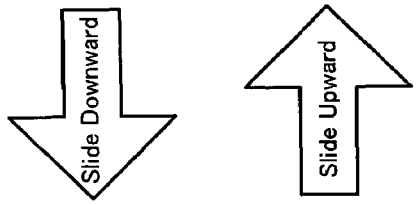
Figure 7:
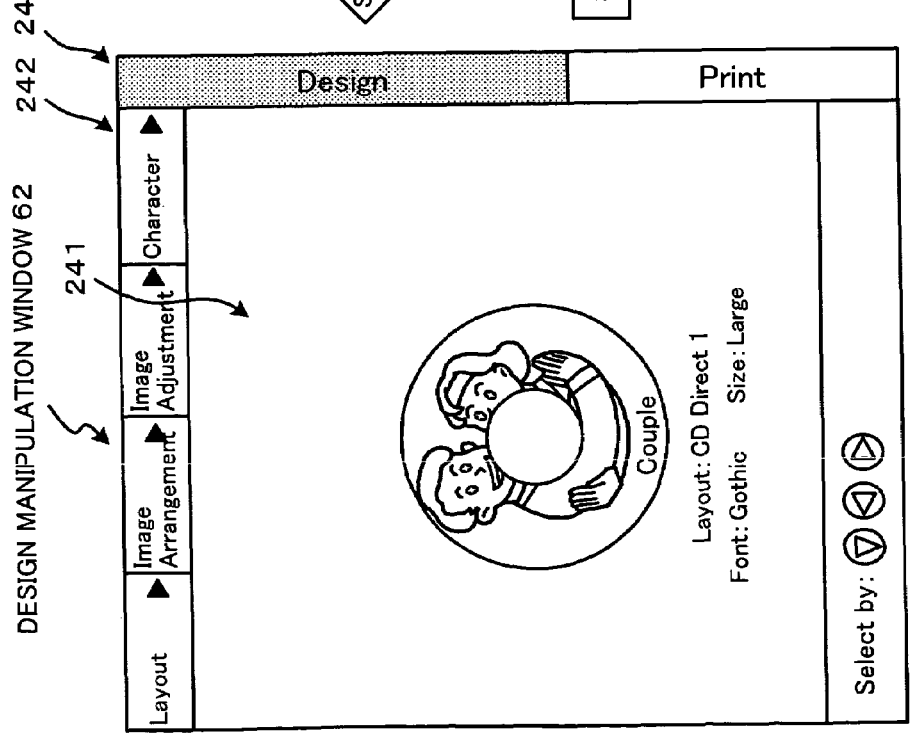

In the structure of the embodiment discussed above, the design manipulation window 62 has the design menu display field 242 located on the left side of the print preview display field 241, while the print manipulation window 64 has the print menu display field 243 located on the right side of the print preview display field 241. In one modified structure shown in FIG. 7, the design manipulation window 62 has the design menu display field 242 located above the print preview display field 241, while the print manipulation window 64 has the print menu display field 243 located below the print preview display field 241. The manipulation windows 62 and 64 are slid upward and downward for the changeover. This arrangement enables the print preview display field 241 and either of the menu display fields 242 and 243 to be displayed in the appropriate size on the portrait-type screen (for example, the size A4 long) of the display 31. In this modified structure, the option bar display field 244 is located to have the longitudinal axis in the vertical direction.

In the structure of the embodiment, the print preview display field 241 for displaying an image is used as the viewer display field of the invention. When the manipulation object is a document file, a document may be displayed in the viewer display field.

The embodiment discussed above regards the user interface used to process the still image captured from the HDD/DVD recorder 40. The technique of the invention is, however, not restricted to still images captured from the HDD/DVD recorder 40 but is also applicable to, for example, still images downloaded via the Internet and still images taken with a digital still camera.

Second Embodiment

Figure 8:
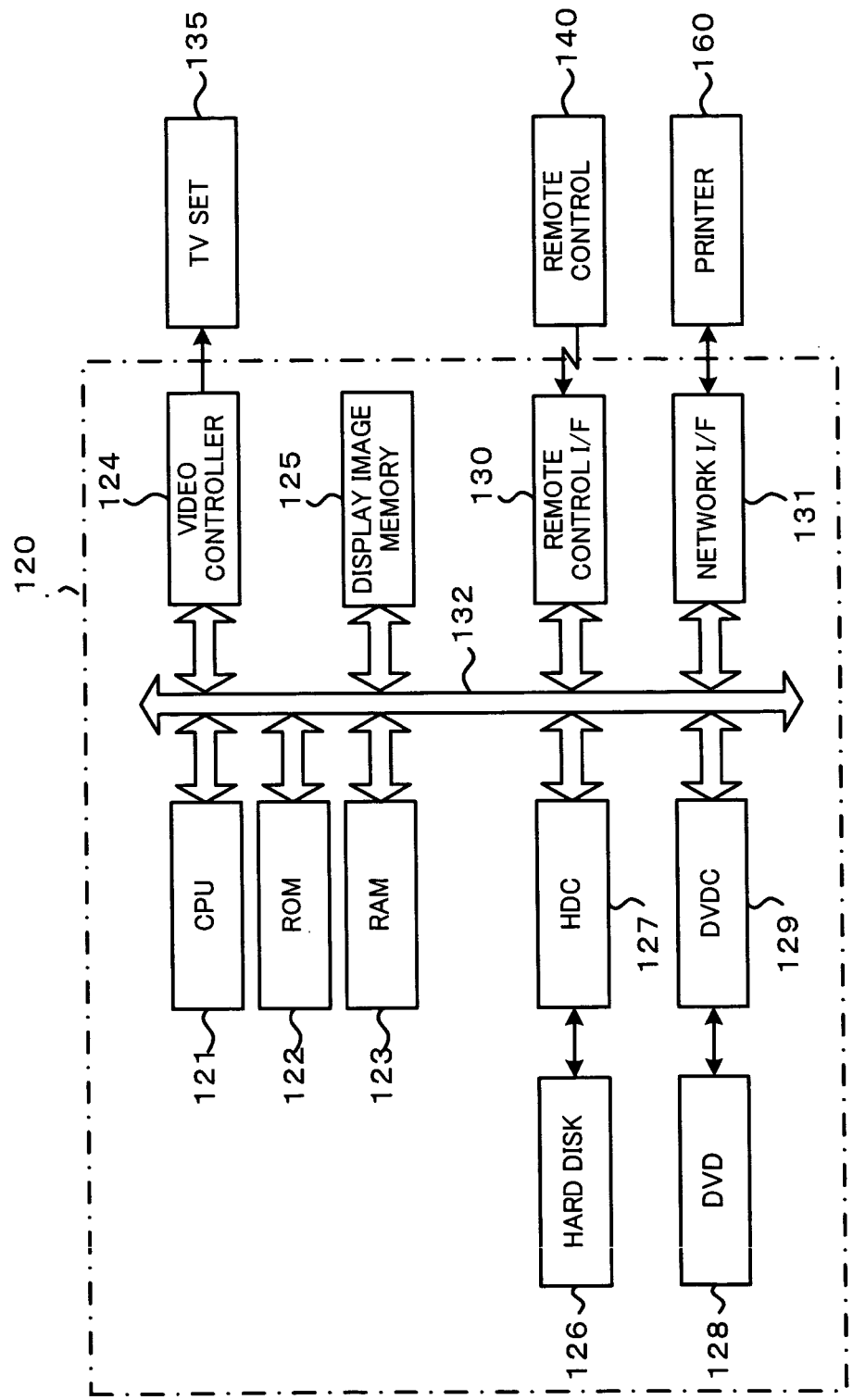
FIG. 8 schematically illustrates the construction of an HDD/DVD recorder 120 in a second embodiment of the invention.
Figure 9:
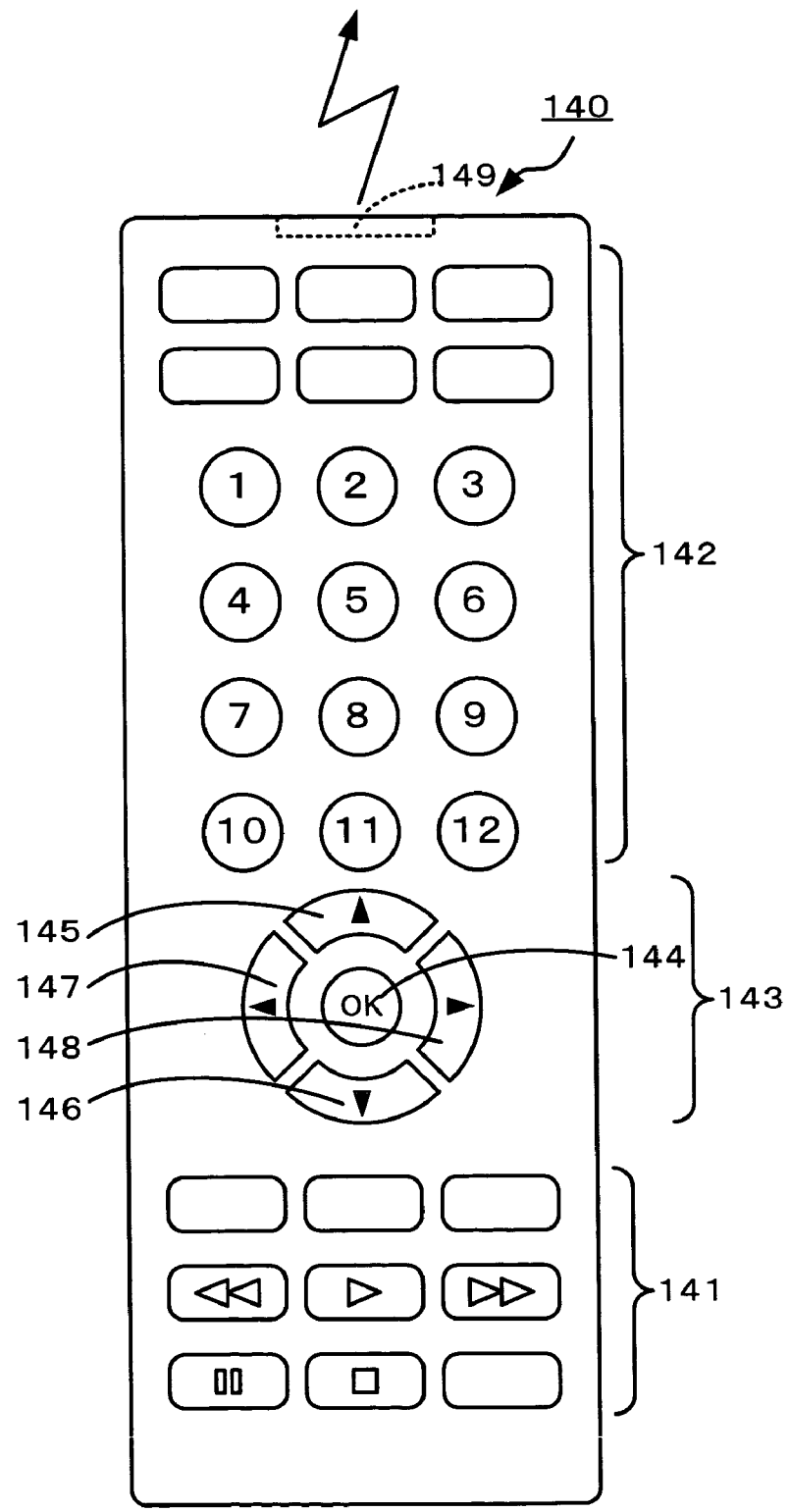
FIG. 9 shows the appearance of a remote control 140.
Figure 10:
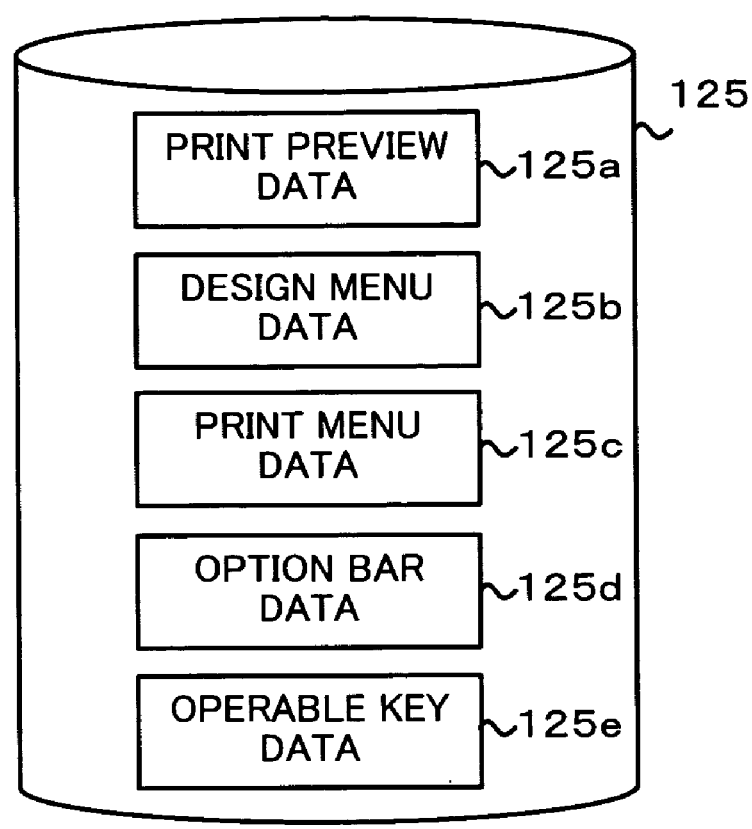
FIG. 10 shows the structure of a display image memory 125.
Figure 11:
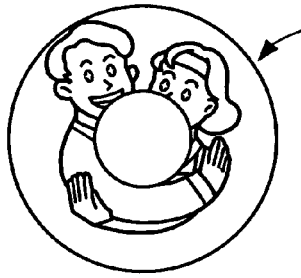
FIG. 11 shows the contents of respective data.
Figure 11:
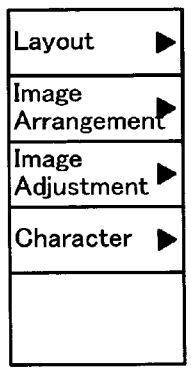
Figure 11:
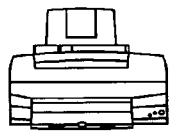
Figure 11:
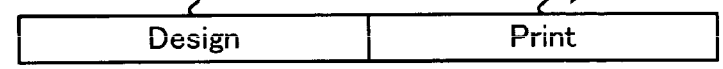
Figure 12:
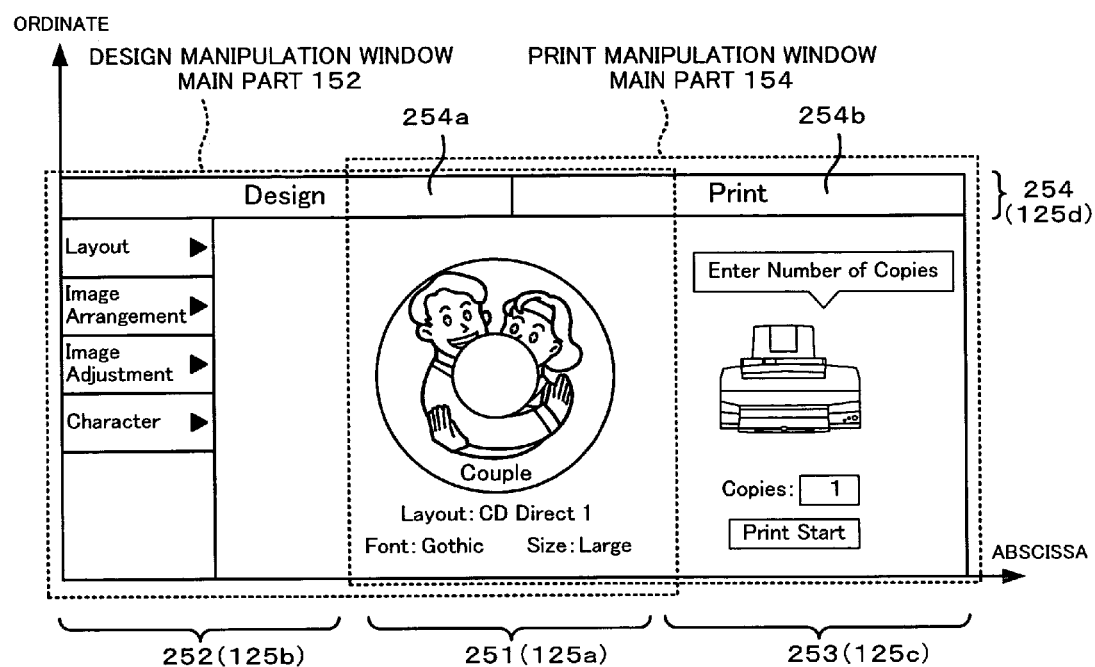
FIG. 12 shows main part 152 or 154 of each manipulation window.

FIG. 8 schematically illustrates the construction of an HDD/DVD recorder 120 in a second embodiment of the invention. FIG. 9 shows the appearance of a remote control 140. FIG. 10 shows the structure of a display image memory 125 in the HDD/DVD recorder 120. FIG. 11 shows the contents of respective data. FIG. 12 shows a design manipulation window main part 152 and a print manipulation window main part 154.

As shown in FIG. 8, the HDD/DVD recorder 120 includes a CPU 121 that executes diverse controls, a ROM 122 that stores various control programs, a RAM 123 that temporarily stores data, a video controller 124 that controls display on a TV set 135 connecting with a video input-output terminal, a display image memory 125 that stores image data of various windows to be displayed on the TV set 135 in the process of execution of captured image processing (discussed later), a hard disk controller 127 that is activated to record image data into a hard disk 126 and read image data from the hard disk 126, a DVD controller 129 that is activated to record image data into a DVD 128 and read image data from the DVD 128, a remote control interface 130 that takes charge of input of infrared signals sent from a remote control 140, and a network interface 131 that takes charge of input and output of data from and to a network printer 160 connected via a LAN cable (not shown). These constituents are interconnected via a bus 132 to ensure transmission of data. An application program that is executed to edit and print motion pictures captured as still images (hereafter referred to as captured image processing program) is stored in the ROM 122 of the HDD/DVD recorder 120.

As shown in FIG. 9, the remote control 140 has a player manipulation area 141 for manipulating the HDD/DVD recorder 120, a TV manipulation area 142 for manipulating the TV set 135, and a common manipulation area 143 for selection of image data in the HDD/DVD recorder 120 and for volume control of the TV set 135. The player manipulation area 141 has a Power ON/OFF key to turn on and off the HDD/DVD recorder 120 and a Changeover key to effectuate a changeover between an HDD mode and a DVD mode, as well as known Playback key, Fast-Forward key, Rewind key, Stop key, and Pause key. The TV manipulation area 142 has a Power ON/OFF key to turn on and off the TV set 135, Channel keys with numbers '1' to '12', and a Sound Channel Changeover key to effectuate a changeover between a main sound channel and a sub sound channel. The common manipulation area 143 has an OK key 144 and an Up Arrow key 145, a Down Arrow key 146, a Left Arrow key 147, and a Right Arrow key 148 located on the top, bottom, left, and right of the OK key 144. The Up Arrow key 145 and the Down Arrow key 146 are used to up and down the channel on the TV set 135 and to move the cursor up and down in various setting windows. The Left Arrow key 147 and the Right Arrow key 148 are used to control the volume on the TV set 135 and to move the cursor left and right in various setting windows. The remote control 140 also has an infrared LED 149 on its upper end. When the user operates one of these keys, the remote control 140 modulates the key signal in a preset signal form and transmits an infrared signal (radio signal) corresponding to the modulated key signal from the infrared LED 149. The remote control interface 130 in the HDD/DVD recorder 120 receives the infrared signal transmitted from the remote control 140, demodulates the received infrared signal, and transfers the demodulated signal to the CPU 121. The CPU 121 then identifies the transferred signal.

The printer 160 is a known inkjet printer that causes color inks to be ejected from color ink cartridges onto a printing medium for printing. The printer 160 is connected with the network interface 131 of the HDD/DVD recorder 120 via a print server (not shown) to print images on a printing medium based on print data input from the HDD/DVD recorder 120 and to output status data on the printing status to the HDD/DVD recorder 120.

Data relating to the captured image processing program are discussed in detail, among the data stored in the display image memory 125 in the HDD/DVD recorder 120. The display image memory 125 stores print preview data 125a, design menu data 125b, print menu data 125b, option bar data 125d, and operable key data 125e as shown in FIG. 10. The print preview data 125a are generated corresponding to the settings of the type of printing medium, the image arrangement, the image adjustment, and the character, based on a still image obtained by capturing a motion picture. The print preview data 125a form a print preview display field 251 for displaying a print preview on the screen of the TV set 135 as shown in FIG. 11(a). The design menu data 125b are related to editing of images and form a design menu display field 252 for displaying four menu options 'Layout' 'Image Arrangement', 'Image Adjustment', and 'Character' on the screen of the TV set 135 as shown in FIG. 11(b). The respective menu options are discussed in the first embodiment and are thus not specifically described here. The design menu data 125b has a hierarchical structure including lower-layer menus (see FIG. 15). The print menu data 125c are related to printing of images and form a print menu display field 253 for displaying a message box that requests the user to enter the required number of copies, an input box that enables the user to enter the required number of copies, and a Print Start button that is selected by the user to give a print start command, on the screen of the TV set 135 as shown in FIG. 11(c). The option bar data 125d are used to call either a design manipulation window 162 (see FIG. 14(a)) or a print manipulation window 164 (see FIG. 14(b)) and form an option bar display field 254 for displaying a design manipulation option bar 254a on the left to call the design manipulation window 162 and a print manipulation option bar 254b on the right to call the print manipulation window 164, on the screen of the TV set 135 as shown in FIG. 11(d). The operable key data 125e are used to display available keys among the OK key 144 and the Up, Down, Left, and Right Arrow keys 145 to 148 on the remote control 140 and form an operable key display field 255 for displaying available keys in a horizontal bar on the screen of the TV set 135 as shown In FIG. 11(e). The operable key data 125e are prepared in various combinations corresponding to the respective menu options in the design menu display field 252 (see FIGS. 15 and 16).

The respective data 125a through 125e relate three numerical data representing the lightness of R, G, and B to each pixel located at a lattice point defined by an ordinate value and an abscissa value in a plane coordinate system. FIG. 12 shows the pixels located on the plane coordinate system in the form of an image, instead of the numerical data. FIG. 12 is similar to FIG. 4 of the first embodiment and is thus not specifically described here. The operable key data 125e (the operable key display field 255) is arranged on the lower side of the design manipulation window main part 152 or on the lower side of the print manipulation window main part 154.

Figure 13:
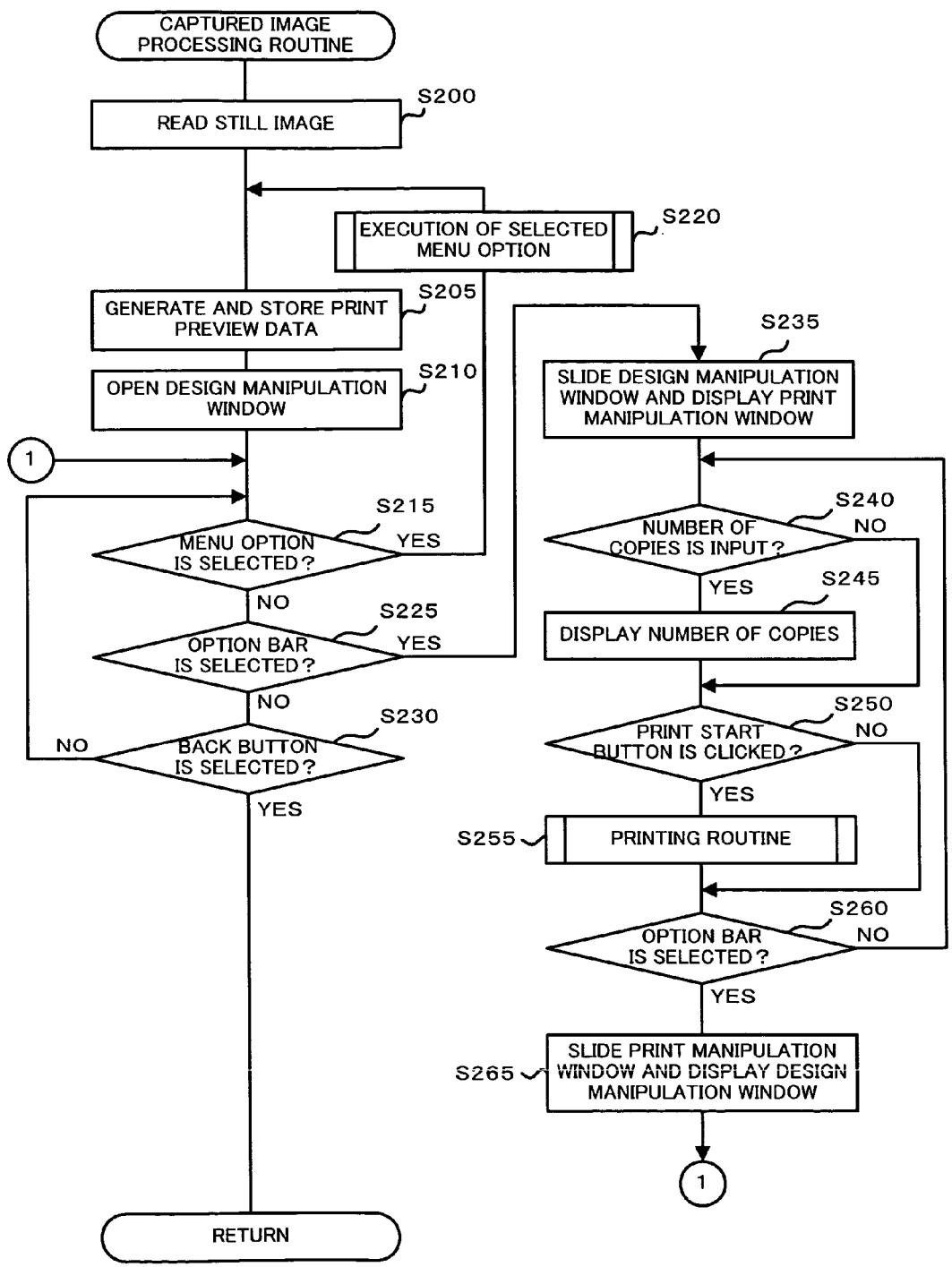
FIG. 13 is a flowchart showing a captured image processing routine.
Figure 14:
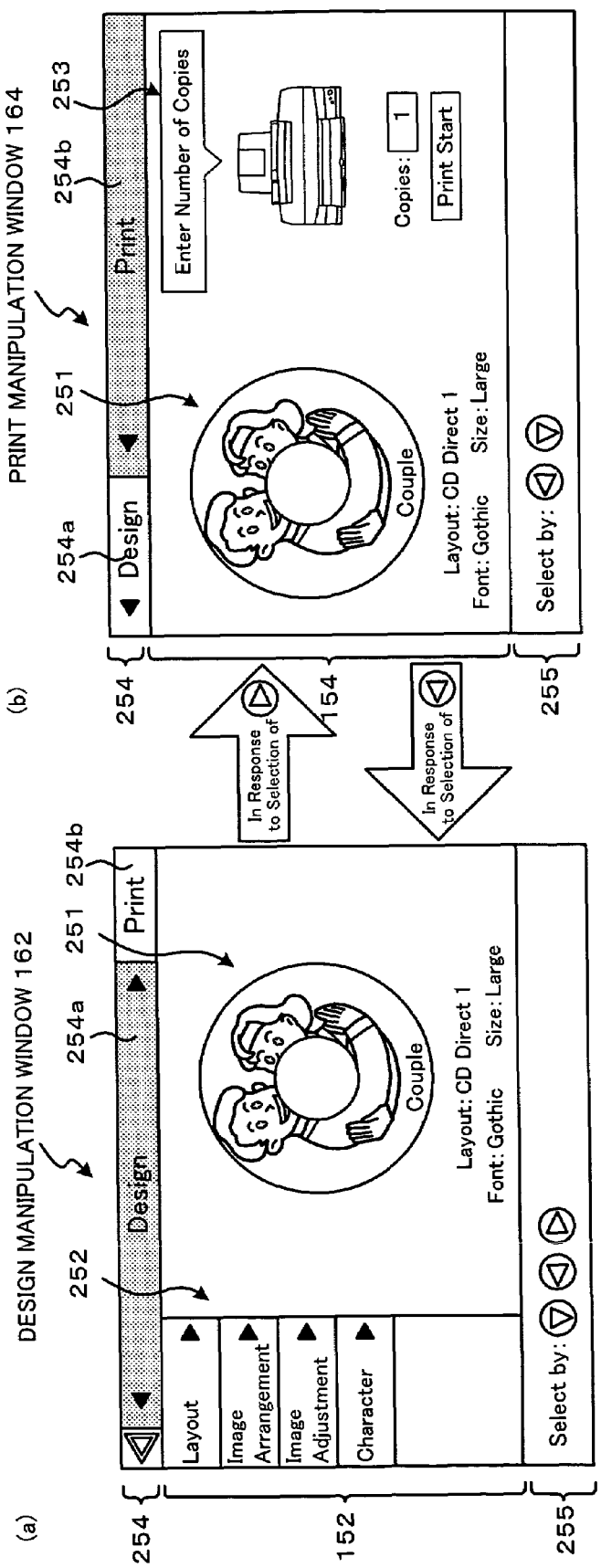
FIG. 14 shows the design manipulation window 162 and the print manipulation window 164.
Figure 15:
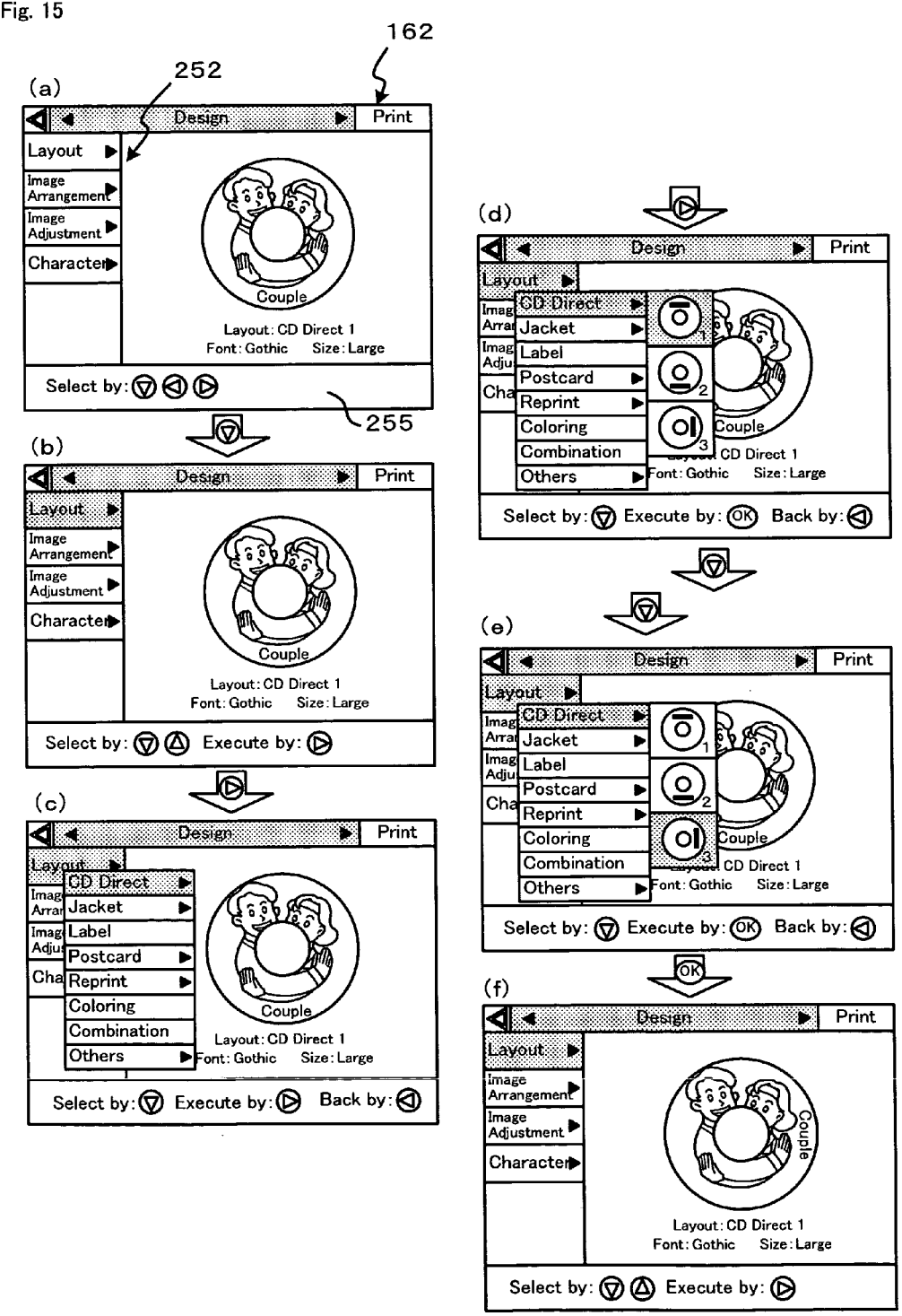
FIG. 15 shows a flow of concrete operations on the design manipulation window 162.
Figure 16:
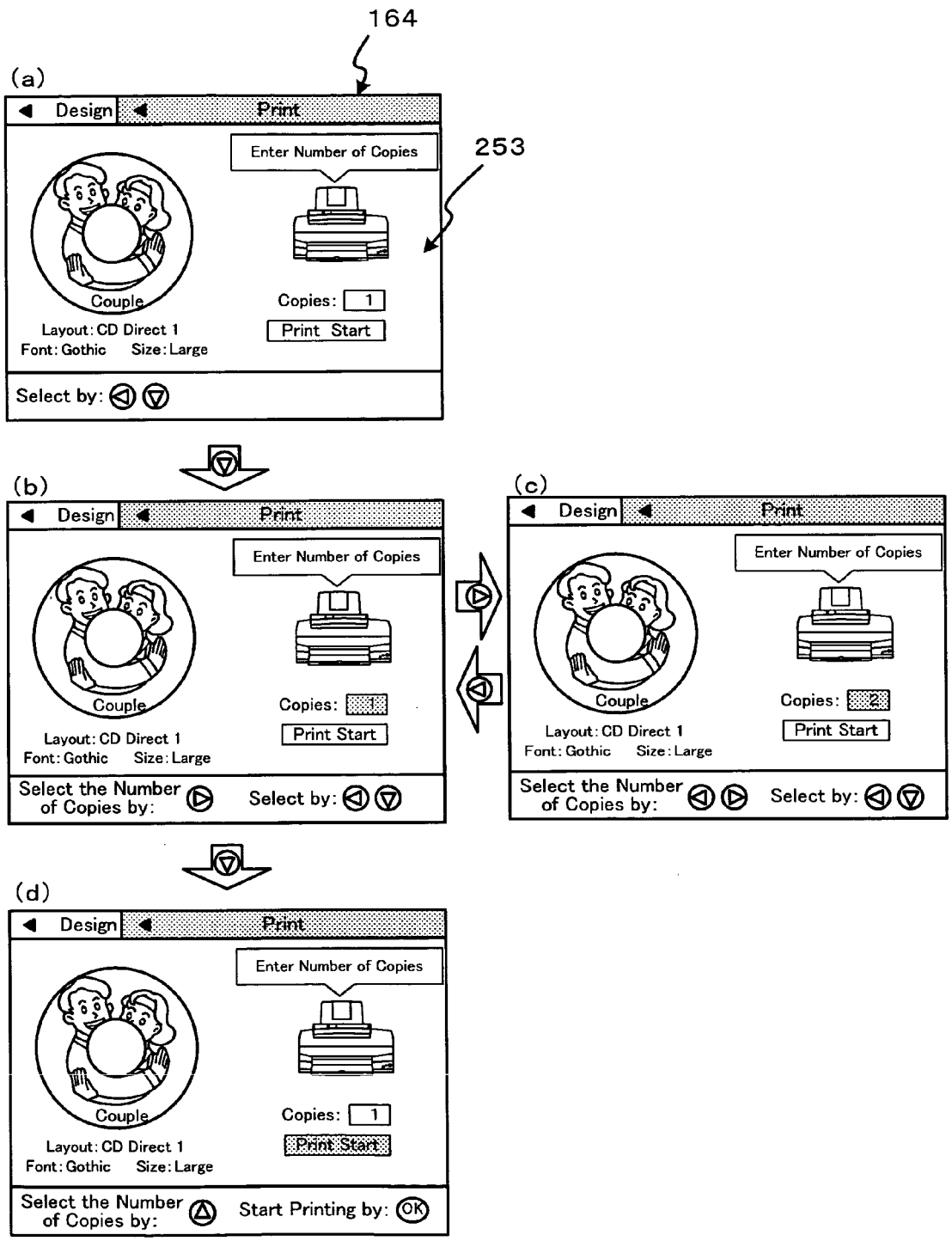
FIG. 16 shows a flow of concrete operations on the print manipulation window 164.

The following describes the operations of the HDD/DVD recorder 120 constructed as discussed above. FIG. 13 is a flowchart showing a captured image processing routine, which is executed by the CPU 121 of the HDD/DVD recorder 120. FIG. 14 shows the design manipulation window 162 and the print manipulation window 164. FIG. 15 shows a flow of concrete operations on the design manipulation window 162. FIG. 16 shows a flow of concrete operations on the print manipulation window 164. In response to capture of a motion picture, the CPU 121 reads the captured image processing program stored in the ROM 122 and executes a series of processing according to the flowchart of FIG. 13.

In response to capture of a motion picture as a still image, the CPU 121 of the HDD/DVD recorder 120 first reads the captured still image (step S200), refers to the settings of the type of printing medium, the image arrangement, the image adjustment, and the character based on the input still image, generates the print preview data 125a, and stores the generated print preview data 125a into the display image memory 125 (step S205). The type of printing medium, the image arrangement, the image adjustment, and the character are set in advance in a hierarchical manner from each menu option displayed in the design menu display field 252. Here the display image memory 125 stores data of the whole image including the print preview data 125a, the design menu data 125b, the print menu data 125c, and the option bar data 125d shown in FIG. 12. The print preview data 125a are updated according to the captured still image and related design and editing operations. The CPU 121 subsequently reads the design manipulation window 162 shown in FIG. 14(a) from the display image memory 125 and opens the design manipulation window 162 on the screen of the TV set 135 design manipulation window main part 152 shown in FIG. 12, the operable key display field 255 that shows available keys, the highlighted design manipulation option bar 254a, and layout information and font information shown in the lower part of the print preview display field 251. At this moment, the cursor is located on the highlighted design manipulation option bar 254a. The design menu display field 252, a 'Back' button in the shape of a double triangular arrow, and the print manipulation option bar 254b are respectively located on the lower side, on the left side, and on the right side of the design manipulation option bar 254a. The operable key display field 255 accordingly shows that the Down, Left, and Right Arrow keys are available. In response to the user's selection of the Down Arrow key, the cursor is shifted to the first menu option 'Layout' in the design menu display field 252. In response to the user's selection of the Left Arrow key, the display is back to a previous window (a window for capturing a still image) In response to the user's selection of the Right Arrow key, the cursor is shifted to the print manipulation option bar 254b to change over the display to the print manipulation window 164.

The CPU 121 then determines whether the user selects one of the menu options in the design menu display field 252 (step S215). The decision is based on an electric signal transferred from the remote control interface 130 to the CPU 121 (that is, the signal corresponding to the infrared signal from the remote control 140). When it is determined at step S215 that the user selects one of the menu options in the design menu display field 252, the CPU 121 executes an operation corresponding to the selected menu option (step S220) and goes back to step S205. In an illustrated example of FIG. 15, the design manipulation window 162 is open on the screen of the TV set 135 (see FIG. 15(a)). When the electric signal sent from the remote control interface 130 in this state represents a press of the Down Arrow key 146, the first menu option 'Layout' is highlighted in the design menu display field 252 (see FIG. 15(b)). The position of the latest highlighted display represents the current cursor position. When the electric signal sent from the remote control interface 130 at this moment represents a press of either the Up Arrow key 145 or the Down Arrow key 146, the upper or the lower menu option is correspondingly highlighted in the design menu display field 252. While one of the menu options is highlighted, transfer of the electric signal representing a press of the Right Arrow key 148 from the remote control interface 130 represents selection of the highlighted menu option. In the state of FIG. 15(c), the Right Arrow key 148 is pressed when the cursor is located on the menu option 'Layout'. A lower-layer menu of the menu option 'Layout' is then open in a hierarchical manner to show available options like 'CD Direct', 'Jacket'. While the cursor is located on the option 'CD Direct' in the lower-layer menu, a press of the Right Arrow key 148 opens a menu in a hierarchical manner to select the location of characters among available options, an upper portion, a lower portion, and a right portion of a CD label as shown in FIG. 15(d). A press of the Up Arrow key 145 or the Down Arrow key 146 shifts the cursor to a desired option in this menu. When the user presses the Down Arrow key 146 to shift the cursor on the menu option for locating the characters on the right side of a CD label as shown in FIG. 15(e) and presses the OK key 144, the print preview is regenerated corresponding to the selection and is redisplayed as shown in FIG. 15(f). In this manner, all the settings on the design manipulation window 162 are executed by the operations of the OK key 144 and the Up, Down, Left, and Right keys 145 to 148. All the settings with regard to the menu options other than the menu option 'Layout' are also executable by the operations of the OK key 144 and the Up, Down, Left, and Right keys 145 to 148.

When it is determined at step S215 that the user does not select any of the menu options, the CPU 121 determines whether the user selects the print manipulation option bar 254b in the option bar display field 254 (step S225). The decision is also based on the electric signal transferred from the remote control interface 130 to the CPU 121 (that is, the signal corresponding to the infrared signal from the remote control 140). When it is determined at step S225 that the print manipulation option bar 254b is selected, the display on the TV set 135 is changed over from the design manipulation window 162 to the print manipulation window 164 (step S235). As shown in FIG. 14, while the design manipulation window 162 is open on the screen of the TV set 135 and the cursor is located on the design manipulation option bar 254a (see FIG. 14(a)), the electric signal representing a press of the Right Arrow key 148 is transferred from the remote control interface 130. The CPU 121 then slides the design manipulation window 162 leftward to gradually make the design menu display field 252 disappear from the left side on the screen of the TV set 135 and to make the print menu display field 253 gradually appear from the right side on the screen of the TV set 135 and thereby eventually displays the print manipulation window 164 shown in FIG. 14(b). The concrete procedure shifts the dotted area surrounding the design manipulation window main part 152 rightward along the abscissa axis with elapse of time in FIG. 12 and reads data corresponding to the shifted dotted area from the display image memory 125, so as to slide the design manipulation window 162 leftward on the screen of the TV set 135. The print manipulation window 164 shown in FIG. 14(b) includes the print manipulation window main part 154 shown in FIG. 12, the operable key display field 255 for displaying available keys, the highlighted print manipulation option bar 254b, and layout information and font information shown in the lower part of the print preview display field 251. When it is determined at step S225 that the print manipulation option bar 254b is not selected in the option bar display field 254, the CPU 121 subsequently determines whether the user selects the 'Back' button (step S230). When the user does not select the 'Back' button, the CPU 121 returns the processing to step S215. When the user selects the 'Back' button, on the other hand, this captured image processing routine is terminated. On the termination of this routine, the screen on the TV set 135 is returned to the display prior to execution of this captured image processing routine.

After the print manipulation window 164 is displayed on the screen of the TV set 135 at step S235, the CPU 121 determines whether the user enters a numerical value in the copy number input box in the print menu display field 253 on the print manipulation window 164 (step S240). In response to the user's entry of a numerical value in the copy number input box, the CPU 121 displays the input numerical value in the input box (step S245) and goes to step S250. When the user does not enter any numerical value in the copy number input box, the CPU 121 immediately goes to step S250. The entry of a numerical value in the copy number input box is executed as shown in FIG. 16. While the cursor is located on the print manipulation option bar 254b (see FIG. 16(a)), a press of the Down Arrow key 146 highlights the copy number input box (see FIG. 16(b)). A press of the Right Arrow key 148 increases the number (see FIG. 16(c)), while a press of the Left Arrow key 147 decreases the number (see FIG. 16(b)). At step S250, the CPU 121 determines whether the user selects the Print Start button in the print menu display field 253. In response to the user's selection of the Print Start button, the CPU 121 executes a printing routine, which converts an image displayed in the print preview display field 251 into print data in a form printable by the printer 160 and outputs the print data to the printer 160 for printing (step S255) and goes to step S260. When the user does not select the Print Start button, the CPU 121 immediately goes to step S260. Selection of the Print Start button is executed as shown in FIG. 16. While the cursor is located on the copy number input box (see FIG. 16(b)), a press of the Down Arrow key 146 shifts the cursor to the Print Start button (see FIG. 16(d)). The user then presses the OK key 144 to effectuate the selection of the Print Start button. In this manner, all the settings on the print manipulation window 164 are executable by the operations of the OK key 144 and the Up, Down, Left, and Right keys 145 to 148.

At step S260, the CPU 121 determines whether the user selects the design manipulation option bar 254a in the option bar display field 254. When the user does not select the design manipulation option bar 254*a*, the CPU 121 returns the processing to step S240. In response to the user's selection of the design manipulation option bar 254*a*, the CPU 121 slides the print manipulation window 164 rightward to gradually make the print menu display field 253 disappear from the right side on the screen of the TV set 135 and to make the design menu display field 252 gradually appear from the left side on the screen of the TV set 135 and thereby eventually displays the design manipulation window 162 (step S265) and goes back to step S215. The concrete procedure shifts the dotted area surrounding the print manipulation window main part 154 leftward along the abscissa axis with elapse of time in FIG. 12 and reads data corresponding to the shifted dotted area from the display image memory 125, so as to slide the print manipulation window 164 rightward. The decision of step S260 is based on the electric signal transferred from the remote control interface 130 to the CPU 121, in the same manner as the decision of step S225.

In the second embodiment, the remote control interface 130 corresponds to the reception module, the display image memory 125 corresponds to the storage module, the TV set 135 corresponds to the display unit, and the CPU 121 corresponds to the radio signal identification module and the display control module of the invention. The design manipulation window 162 or the print manipulation window 164 respectively correspond to the first or the second manipulation window, the design menu display field 252 or the print menu display field 253 respectively correspond to the first or the second manipulation menu display field, and the print preview window 251 corresponds to the common display field of the invention. The design manipulation option bar 254*a* or the print manipulation option bar 254*b* respectively correspond to the first or the second manipulation window option bar of the invention. The description of the HDD/DVD recorder 120 as the second embodiment of the user interface device also explains one embodiment of the user interface display method.

As described above, in the HDD/DVD recorder 120 of the second embodiment, while the design manipulation window 162 is read out and displayed on the screen of the TV set 135, the settings on the design manipulation window 162 and the changeover of the display to the print manipulation window 164 are executed in response to electric signals (commands) generated corresponding to the operations of the OK key 144 and the Up, Down, Left, and Right keys 145 to 148 on the remote control 140. This explanation is also applicable to the print manipulation window 164. Any conventional remote control has an OK key and Up, Down, Left, and Right keys. This arrangement enables all the settings including changeover of the manipulation windows to be executed by simple operations of the OK key and the Up, Down, Left, and Right keys on the conventional remote control.

While the design manipulation window 162 is open on the screen, the print manipulation window 164 is arranged rightward from the cursor position. A press of the Right Arrow key 148 on the remote control 140 slides the design manipulation window 162 and changes over the display to the print manipulation window 164. This arrangement ensures the reasonable operation for the changeover of the manipulation window. In the course of changeover of the manipulation window, the option bars 254*a* and 254*b* are slid to switch the longer side and the shorter side. This enables the user to visually recognize the current display between the two manipulation windows. The switched manipulation window includes the shorter option bar 254*a* or 254*b* corresponding to the previously displayed window. The shorter option bar 254*a* or 254*b* enables the user to readily recognize the previously displayed window without any additional operations on the remote control 140.

The print preview as the processing object is continuously displayed in the print preview window 251 through the changeover of the display between the design manipulation window 162 and the print manipulation window 164. This arrangement desirably enhances the user's working efficiency, compared with the structure of making the print preview once disappear from the display and calling the print preview again. In the case of execution of printing after editing of the image or execution of editing of the image after printing, the user generally desires to easily confirm the identification of the print preview before and after the changeover of the manipulation window. The technique of this embodiment advantageously attains this requirement.

The HDD/DVD recorder 120 may have a built-in computer including the remote control interface 130, the CPU 121, and the display image memory 125. This actualizes the principle of the invention in a relatively easy manner. The user interface device of the invention may be mounted on a disk recorder, which uses either a hard disk or a digital versatile disc as the recording medium of motion pictures.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The second embodiment describes the changeover of the display between the design manipulation window 162 and the print manipulation window 164. The technique of the invention is, however, not restricted to the changeover of the display between the design manipulation window 162 and the print manipulation window 164 but is applicable to changeover of the display between two arbitrary manipulation windows.

Figure 17:
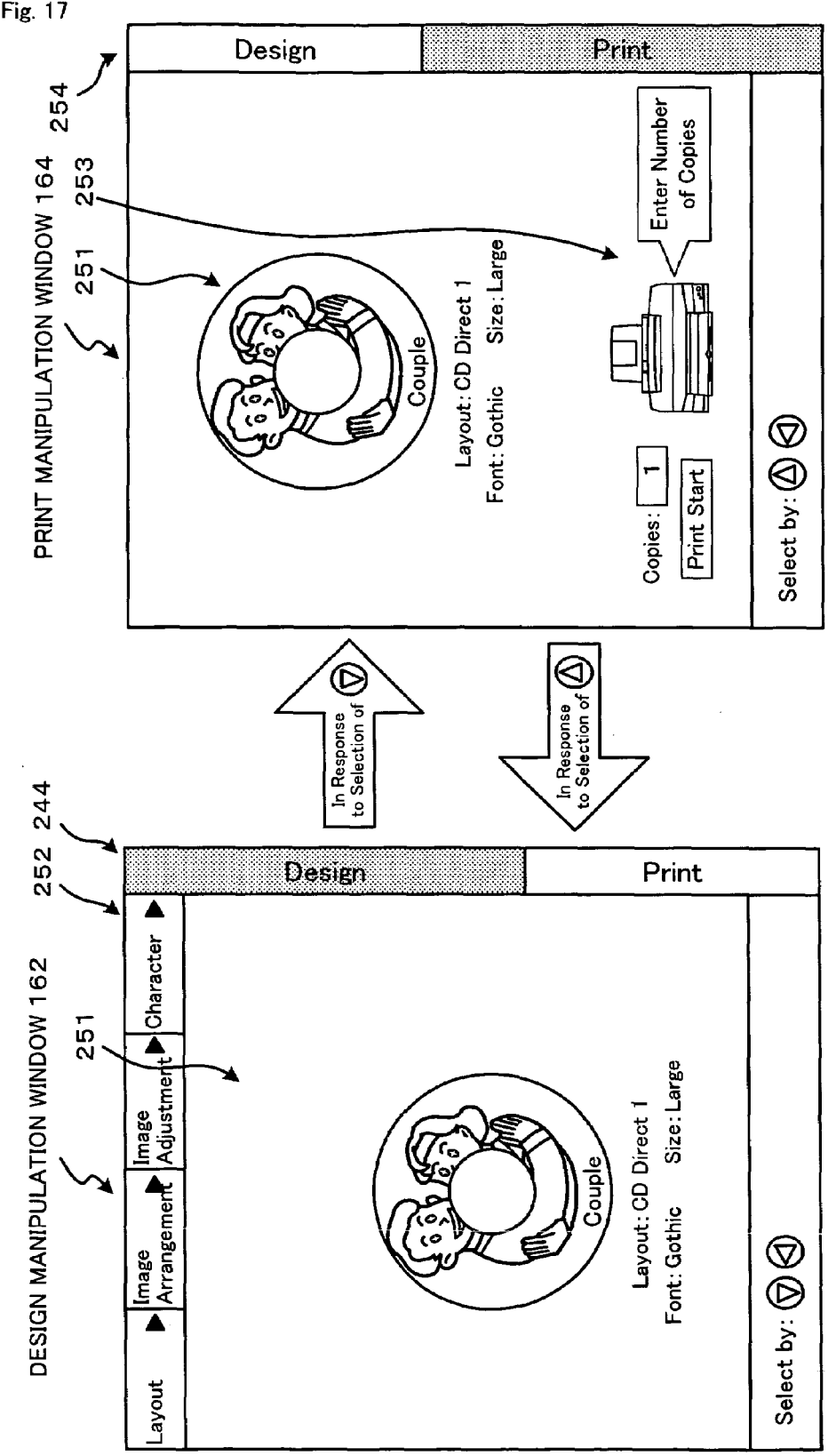
FIG. 17 shows each manipulation window in another embodiment.

In the structure of the embodiment discussed above, the design manipulation window 162 has the design menu display field 252 located on the left side of the print preview display field 251, while the print manipulation window 64 has the print menu display field 253 located on the right side of the print preview display field 251. In one modified structure shown in FIG. 17, the design manipulation window 162 has the design menu display field 252 located above the print preview display field 251, while the print manipulation window 164 has the print menu display field 253 located below the print preview display field 251. The manipulation windows 162 and 164 are slid upward and downward for the changeover. In this modified structure, the option bar display field 254 is located to have the longitudinal axis in the vertical direction.

In the structure of the second embodiment, the print preview display field 251 for displaying an image is used as the common display field of the invention. When the manipulation object is a document file, a document may be displayed in the common display field.

What is claimed is:

1. A user interface device that causes a user interface-related window to be displayed on a display unit, which is capable of displaying various pieces of information, said user interface device comprising:
    a command input module that receives a user command;
    a storage module that stores at least data of a first manipulation menu display field, data of a second manipulation menu display field, and data of a viewer display field for displaying a processing object of each manipulation; and a display control module that, when the user command received by said command input module is a first manipulation window display command, reads the data of the first manipulation menu display field and the data of the viewer display field from said storage module and displays a first manipulation window, which includes the first manipulation menu display field arranged at a predetermined location on a periphery of the viewer display field, on said display unit and when the user command received by said command input module of the second manipulation menu display field and the data of the viewer display field from said storage module and displays a second manipulation window, which includes the second manipulation menu display field arranged at a location opposite to the predetermined location on the periphery of the viewer display field, on said display unit, in the case of input of the second manipulation window display command during display of the first manipulation window on said display unit, said display control module sliding the first manipulation window to make the first manipulation menu display field disappear from the display on said display unit and to make the second manipulation menu display field appear on the display on said display unit, while making the viewer display field remain on the display on said display unit, so as to display the second manipulation window on said display unit, in the case of input of the first manipulation window display command during display of the second manipulation window on said display unit, said display control module sliding the second manipulation window to make the second manipulation menu display field disappear from the display on said display unit and to make the first manipulation menu making the viewer display field remain on the display on said display unit, so as to display the first manipulation window on said display unit, wherein said storage module stores a first manipulation window option bar corresponding to the first manipulation window display command and a second manipulation window option bar corresponding to the second manipulation window display command, for display of the first manipulation window on said display unit, said display control module arrays the first manipulation window option bar and the second manipulation window option bar in an identical direction of an alignment of the viewer display field and the first manipulation menu display field and displays the first manipulation window option bar longer and the second manipulation window option bar shorter, and for display of the second manipulation window on said display unit, said display control module arrays the first manipulation window option bar and the second manipulation window option bar in an identical direction of an alignment of the viewer display field and the second manipulation menu display field and displays the second manipulation window option bar longer and the first manipulation window option bar shorter.

2. A user interface device in accordance with claim 1, wherein the first manipulation window has the first manipulation menu display field located on a left side or a right side of the viewer display field, the second manipulation window has the second manipulation menu display field located on the right side or the left side of the viewer display field, and said display control module slides the first manipulation window or the second manipulation window leftward or rightward.

3. A user interface device in accordance with claim 1, wherein the first manipulation window has the first manipulation menu display field located on an upper side or a lower side of the viewer display field, the second manipulation window has the second manipulation menu display field located on the lower side or the upper side of the viewer display field, and said display control module slides the first manipulation window or the second manipulation window upward or downward.

4. A user interface device in accordance with claim 1 wherein said display control module slides the first manipulation window option bar and the second manipulation window option bar to change the longer side and the shorter side, when the first manipulation window is slid to change over the display to the second manipulation window on said display unit or when the second manipulation window is slid to change over the display to the first manipulation window.

5. A user interface device in accordance with claim 1, wherein the first manipulation menu display field displays at least one of a menu, a guidance, and a data setting input box relating to image editing, the second manipulation menu display field displays at least one of a menu, a guidance, and a data setting input box relating to image printing, and the viewer display field displays an image as an object of the image editing or the image printing.

6. A user interface device in accordance with claim 5, wherein the viewer display field displays a captured image of a motion picture as the object of the image editing or the image printing.

7. A user interface device in accordance with claim 6, said user interface device being mounted on a printer, which connects with a disk recorder using a hard disc or a digital versatile disc as a recording medium of motion pictures and has a function of capturing a motion picture from the recording medium of the disk recorder.

8. A user interface device in accordance with claim 1, said user interface device is a computer comprising said display unit, said command input module, said storage module, and said display control module.

9. A user interface display method by computer software that reads required data from a storage module, which stores at least data of a first manipulation menu display field, data of a second manipulation menu display field, and data of a viewer display field for displaying a processing object of each manipulation, and displays the required data on a display unit, said user interface display method comprising the steps of:

(a) receiving a user command;

(b) when the user command is a first manipulation window display command, reading the data of the first manipulation menu display field and the data of the viewer display field from said storage module and displaying a first manipulation window, which includes the first manipulation menu display field arranged at one side on periphery of the viewer display field, on said display unit;

(c) when the user command is a second manipulation window display command, reading the data of the second manipulation menu display field and the data of the viewer display field from said storage module and displaying a second manipulation window, which includes the second manipulation menu display field arranged at the opposite side on the periphery of the viewer display field, on said display unit;

(d) in the case of input of the second manipulation window display command during display of the first manipulation window on said display unit, sliding the first manipulation window to make the first manipulation menu display field disappear from the display on said display unit and to make the second manipulation menu display field appear on the display on said display unit, while making the viewer display field remain on the display on said display unit, so as to display the second manipulation window on said display unit; and (e) in the case of input of the first manipulation window display command during display of the second manipulation window on said display unit, sliding the second manipulation window to make the second manipulation menu display field disappear from the display on said display unit and to make the first manipulation menu display field appear on the display on said display unit, while making the viewer display field remain on the display on said display unit, so as to display the first manipulation window on said display unit, wherein said storage module stores a first manipulation window option bar corresponding to the first manipulation window display command and a second manipulation window option bar corresponding to the second manipulation window display command, for display of the first manipulation window on said display unit, said display control module arrays the first manipulation window option bar and the second manipulation window option bar in an identical direction of an alignment of the viewer display field and the first manipulation menu display field and display.s the first manipulation window option bar longer and the second manipulation window option bar shorter, and for display of the second manipulation window on said display unit, said display control module arrays the first manipulation window option bar and the second manipulation window option bar in an identical direction of an alignment of the viewer display field and the second manipulation menu display field and displays the second manipulation window option bar longer and the first manipulation window option bar shorter.

10. A user interface device in accordance with claim 1, said user interface device further comprising:

a reception module that receives a radio signal transmitted from a remote control unit, in response to operation of one of Up, Down, Left, Right, and OK keys on said remote control unit; and a radio signal identification module that identifies the radio signal received by said reception module as one of Up, Down, Left, Right, and OK commands;

wherein when the first manipulation window or the second manipulation window is read from the storage module and is displayed on the display unit, the display control module executes a setting on the displayed manipulation window or a changeover of display to the other manipulation window, in response to one of the Up, Down, Left, Right, and OK commands identified by said radio signal identification module.

* * * * *